United States Patent
Carter et al.

(10) Patent No.: US 9,608,431 B2
(45) Date of Patent: Mar. 28, 2017

(54) SYSTEM AND METHOD TO INTERRUPT A DC CURRENT IN A HIGH VOLTAGE CIRCUIT BY USE OF AN AC CIRCUIT BREAKER

(71) Applicant: Lighthouse Energy Solutions LLC, Morgantown, PA (US)

(72) Inventors: William A. Carter, St. Augustine, FL (US); Scott C. Carter, Morgantown, PA (US); Ilkka T. Pylkkanen, Doylestown, PA (US)

(73) Assignee: Lighthouse Energy Solutions LLC, Morgantown, PA (US)

( * ) Notice: Subject to any disclaimer, the term of this patent is extended or adjusted under 35 U.S.C. 154(b) by 429 days.

(21) Appl. No.: 14/480,092

(22) Filed: Sep. 8, 2014

(65) Prior Publication Data

US 2014/0376132 A1 Dec. 25, 2014

Related U.S. Application Data

(60) Continuation-in-part of application No. 14/319,571, filed on Jun. 30, 2014, now Pat. No. 9,236,167, which (Continued)

(51) Int. Cl.
*H02H 7/26* (2006.01)
*H02G 15/34* (2006.01)

(Continued)

(52) U.S. Cl.
CPC .......... *H02H 3/093* (2013.01); *H02G 15/34* (2013.01); *H02H 7/268* (2013.01); *H02J 3/36* (2013.01);

(Continued)

(58) Field of Classification Search
CPC ........ H02H 3/093; H02H 7/268; H02G 15/34; H02J 2003/365; H02J 3/36
See application file for complete search history.

(56) References Cited

U.S. PATENT DOCUMENTS 3,534,226 A * 10/1970 Lian ...................... H01H 33/16
218/1
4,616,195 A 10/1986 Ward et al.
(Continued)

FOREIGN PATENT DOCUMENTS

WO WO-0184689 A1 11/2001

OTHER PUBLICATIONS

International Searching Authority, International Search Report and Written Opinion of International Searching Authority relating to International Application No. PCT/US2011/063106, dated Mar. 29, 2012 (11 pgs).

(Continued)

*Primary Examiner* — Colleen Dunn
(74) *Attorney, Agent, or Firm* — Harris Beach PLLC

(57) ABSTRACT

An electrical circuit to interrupt a DC current includes a bypass switch and an AC high voltage breaker which includes interrupters that are rated for carrying a current having a value of the DC current for a period of time less than or equal to continuous duty. The first interrupter is electrically coupled in parallel with the bypass switch. A making switch causes a cancellation current to flow from an energy source through the second interrupter, and through the first interrupter, in addition to the DC current. The AC high voltage breaker is adapted to a DC service as the DC current in addition to the cancellation current causes an arc quench which allows the AC high voltage breaker to cause the interruption of the DC current in the electrical circuit. A (Continued)

method for interrupting a DC current flowing in an AC high voltage circuit breaker is also described.

24 Claims, 16 Drawing Sheets

Related U.S. Application Data is a division of application No. 13/310,181, filed on Dec. 2, 2011, now Pat. No. 8,774,883.

(60) Provisional application No. 61/522,456, filed on Aug. 11, 2011, provisional application No. 61/418,946, filed on Dec. 2, 2010.

(51) Int. Cl.
*H02H 3/093* (2006.01)
*H02J 3/36* (2006.01)

(52) U.S. Cl.
CPC ......... *H02J 2003/365* (2013.01); *Y02E 60/60* (2013.01)

(56) References Cited

U.S. PATENT DOCUMENTS

| | | | | |
|---|---|---|---|---|
| 4,616,495 A | * | 10/1986 | Menzel | B21C 37/12 72/49 |
| 6,730,851 B2 | * | 5/2004 | Ladie' | H01B 12/16 174/125.1 |
| 8,665,617 B2 | | 3/2014 | Asplund | |
| 8,774,883 B2 | | 7/2014 | Carter et al. | |
| 2004/0058822 A1 | * | 3/2004 | Ohmatsu | H01B 12/00 505/100 |
| 2005/0280405 A1 | * | 12/2005 | Bray | H03H 1/02 323/312 |
| 2006/0211579 A1 | * | 9/2006 | Yamaguchi | H01B 12/14 505/230 |

OTHER PUBLICATIONS

Callavik, Magnus, et al. ABB's hybrid HVDC breaker, an innovation breakthrough enabling reliable HVDC grids, ABB Review Feb. 2013 pp. 6-13.

Hafner, Jurgen, et al., "Proactive Hybrid HVDC Breakers—A key innovation for reliable HVDC grids", The Electric Power System of the Future—Integrating Supergrids and Microgrids International Symposium in Bologna, Italy Sep. 13-15, 2011 pp. 1-8.

Callavik, Magnus, et al. The Hybrid HVDC Breaker an Innovation Breakthrough Enabling Reliable HVDC Grids, ABB Grid Systems, Technical Paper Nov. 2012, pgs. (10 pgs).

* cited by examiner

DUAL CANCELLATION CIRCUIT
WITH DC VOLTAGE SOURCE

SYSTEM AND METHOD TO INTERRUPT A DC CURRENT IN A HIGH VOLTAGE CIRCUIT BY USE OF AN AC CIRCUIT BREAKER

CROSS REFERENCE TO RELATED APPLICATION

This application is a Continuation in Part of co-pending Divisional U.S. patent application Ser. No. 14/319,571, SUPERCONDUCTING DIRECT CURRENT TRANSMISSION SYSTEM, filed Jun. 30, 2014, and also claims priority to and the benefit of U.S. patent application Ser. No. 13/310,181, filed Dec. 2, 2011, SUPERCONDUCTING DIRECT CURRENT TRANSMISSION SYSTEM, issued Jul. 8, 2014 as U.S. Pat. No. 8,774,883, U.S. Provisional Application Ser. No. 61/418,946, filed Dec. 2, 2010, An Electrical and Hydrogen Transmission System Consisting of Specially Designed Segments, and U.S. Provisional Application Ser. No. 61/522,456, filed Aug. 11, 2011, Transmission System for Electricity and Hydrogen Including Specially Designed Segments, all of which applications and patent are incorporated herein by reference in their entirety for all purposes.

FIELD OF THE APPLICATION

This invention relates to the field of DC power transmission as a viable means of energy transport over long distances and more specifically, addresses switching and control systems designed to safely deliver energy through the use of superconductor technology.

BACKGROUND

Currently, power transmission in the United States relies on an alternating current (AC) transmission network with three distinctly separate and disparate systems. The failure of any one system cannot be supported by another, and the fact that these networks fail to communicate and interface limits the ability of energy providers to support peak demands and take advantage of regional capabilities and time zones. The existing technology has numerous limitations and drawbacks.

One drawback is that line losses equivalent to $I^2R$ heating amounts to 6.2% to 7.0% of the energy carried by the transmission line. Additional losses include dielectric, skin effect, and induction losses. For example, inductive coupling between phases require conductor transposition frequently to compensate for this magnetic interphase coupling. These transpositions result in increased construction costs.

Another drawback is the inability to communicate, support, and coexist in multiple markets. This inability to support distant needs ultimately results in a cascade effect by contributing to uncontrollable pricing fluctuations.

Yet another drawback is that transmission line inductance can and does result in generating a current component, which lags behind the voltage. This component will increase $I^2R$ losses and can contribute to system stability problems. This requires expensive and complex solutions to reduce the lagging component magnitude. For example, a long transmission line sometimes requires a large capacitor bank to be installed in series with the line to neutralize the inductance. The longer the line, the greater the inductance, and the greater the size of the capacitor bank required.

SUMMARY

A method for interrupting a DC current flowing in an AC high voltage circuit breaker includes the steps of: providing the AC high voltage circuit breaker includes a first interrupter and a second interrupter, the first interrupter capable of passing the DC current for a period of time and the second interrupter capable of passing a cancellation current for another period of time, and a making switch; opening the first interrupter causing the DC current to flow through a first interrupter arc as a first contact of the first interrupter moves away from a second contact of the first interrupter causing a gap between the first contact of the first interrupter and the second contact of the first interrupter; closing the making switch to cause the cancellation current to flow through the making switch, the second interrupter and the first interrupter arc in a direction opposite to the DC current; arc quenching the DC current flowing in the AC high voltage circuit breaker as the gap between the first contact of the first interrupter and the second contact of the first interrupter approaches a maximum gap distance and as a sum of the DC current and the cancellation current in the first interrupter passes through zero; and arc quenching the sum of the DC current and the cancellation current in the second interrupter about when a value of the cancellation current reaches or passes through zero.

In one embodiment, the step of providing further includes providing a bypass switch capable of continuously passing the DC current generated by a DC voltage source when the bypass switch is closed, and before the step of opening the first interrupter, while both of the first interrupter and the second interrupter are closed and the making switch is open, opening the bypass switch causing the DC current which was previously flowing in the bypass switch to flow through the first interrupter.

In another embodiment, the step of arc quenching the sum of the DC current and the cancellation current includes extinguishing the cancellation current flowing in the second interrupter when the cancellation current reaches zero as caused by a tuned voltage source.

In yet another embodiment, the step of arc quenching the sum of the DC current and the cancellation current includes extinguishing the cancellation current flowing in the second interrupter when the cancellation current reaches zero of an AC cycle wherein the cancellation current is generated by an AC voltage source or an oscillating DC voltage source.

In yet another embodiment, the step of arc quenching the sum of the DC current and the cancellation current includes extinguishing the cancellation current flowing in the second interrupter when a series wired capacitor reaches an equilibrium charge state.

In yet another embodiment, the step of providing includes providing the making switching includes at least one silicon controlled rectifier (SCR).

In yet another embodiment, the step of providing includes providing the making switching includes at least one triggered spark gap.

In yet another embodiment, the step of providing includes providing the making switching includes at least one fast electrically triggered mechanical switch.

In yet another embodiment, the step of providing the AC high voltage circuit breaker includes the first interrupter and the second interrupter includes providing the AC high voltage circuit breaker includes the first interrupter and the second interrupter wherein the first interrupter and the second interrupter are independently operable by a first interrupter trigger signal and a second interrupter trigger signal.

In yet another embodiment, the step of providing the AC high voltage circuit breaker includes the first interrupter and the second interrupter includes providing the AC high voltage circuit breaker includes the first interrupter and the second interrupter wherein the first interrupter and the second interrupter are operated by a common mechanism wherein following a common trigger signal there is a time delay t between the first interrupter opening and the second interrupter opening.

In yet another embodiment, the steps of interrupting the DC current flowing in the AC high voltage circuit breaker includes interrupting the DC current associated with a DC high voltage transmission line operating at a transmission line voltage of greater than or equal to 5 kV.

In yet another embodiment, the steps of interrupting the DC current flowing in the AC high voltage circuit breaker includes interrupting the DC current associated with a DC high voltage submarine transmission line.

In yet another embodiment, the steps of interrupting the DC current flowing in the AC high voltage circuit breaker includes interrupting the DC current associated with a DC high voltage sourced from one or more Wind generators.

According to another aspect, an electrical circuit to interrupt a DC current includes an AC high voltage breaker which includes a first interrupter and a second interrupter. Both of the first interrupter and the second interrupter are rated for carrying a current having a value of the DC current for a period of time less than or equal to continuous duty, a first interrupter first terminal electrically coupled to a second interrupter first terminal. A making switch is operatively coupled to an energy source and configured to cause a cancellation current to flow from the energy source either directly or via a coupling transformer through the second interrupter, and through the first interrupter in addition to the DC current following a triggered operation of the making switch. The AC high voltage breaker is adapted to a DC service as the DC current in addition to the cancellation current causes an arc quench which allows the AC high voltage breaker to cause the interruption of the DC current in addition to the cancellation current in the electrical circuit.

In one embodiment, the electrical circuit to interrupt the DC current further includes a bypass switch rated to carry the DC current at continuous duty, and the first interrupter is electrically coupled in parallel with the bypass switch, and the first interrupter first terminal is electrically coupled to a bypass switch first terminal and the second interrupter first terminal.

In another embodiment, the DC current is associated a high voltage transmission line operating at a transmission line voltage of 5 kV or greater.

In yet another embodiment, the making switch includes at least one silicon controlled rectifier (SCR).

In yet another embodiment, the making switch includes at least one triggered spark gap.

In yet another embodiment, the making switch includes at least one fast electrically triggered mechanical switch.

In yet another embodiment, the making switch is disposed in electrical series between the second interrupter second terminal and the energy source.

In yet another embodiment, the making switch is operatively coupled between the energy source and a first winding of the coupling transformer, and a second winding of the coupling transformer electrically disposed in series between the second interrupter and the first interrupter second terminal. The transformer is configured to cause the cancellation current to flow in the first interrupter in addition to the DC current after a closure of the making switch.

In yet another embodiment, the energy source includes a tuned voltage source.

In yet another embodiment, the energy source includes an AC voltage source or an oscillating DC voltage source.

In yet another embodiment, the electrical circuit includes a DC voltage source dual cancellation circuit or an AC voltage source dual cancellation circuit.

The foregoing and other aspects, features, and advantages of the application will become more apparent from the following description and from the claims.

BRIEF DESCRIPTION OF THE DRAWINGS

The features described herein can be better understood with reference to the drawings described below. The drawings are not necessarily to scale, emphasis instead generally being placed upon illustrating the principles of the application. In the drawings, like numerals are used to indicate like parts throughout the various views.

DETAILED DESCRIPTION

Figure 1:
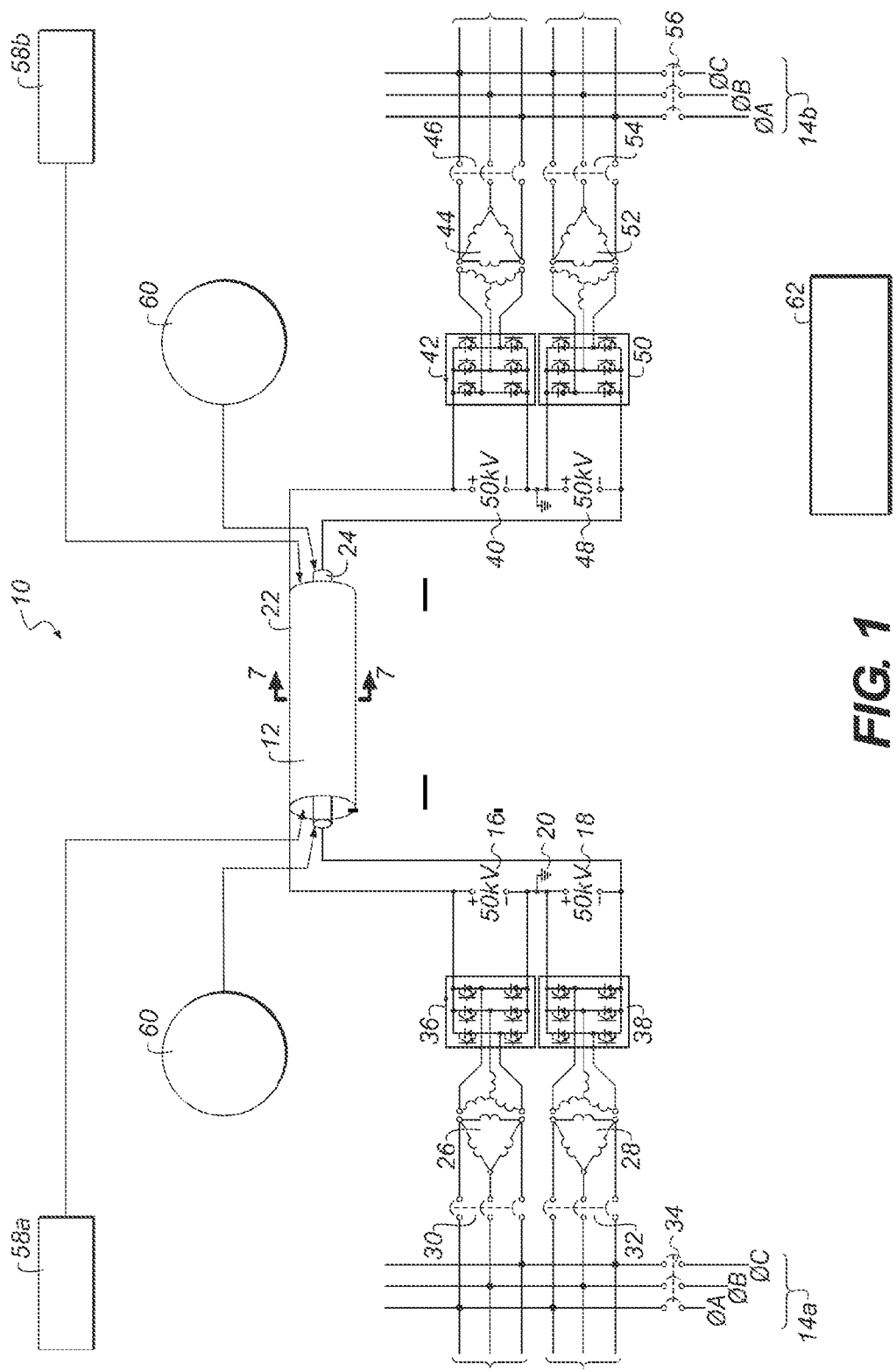
FIG. 1 depicts a system electrical diagram of an exemplary embodiment of a DC coaxial superconducting system.

DC Superconducting Transmission Line Segment Protected by Three Phase AC Circuit Breakers A superconducting transmission system was envisioned which would provide direct current (DC) electrical transmission of 5,000 Megawatts of 50 kA at a DC voltage of 100 kV between conductors, thereby transporting energy while simultaneously moving liquid hydrogen across great distances.

The express purpose in constructing the system utilizing superconducting metal is to extensively reduce the enormous $I^2R$ power losses, which would normally occur in a 50 kA conductor. The superconducting material must be chilled at a low temperature to gain superconducting characteristics. The cooling capabilities of various elements at their melting temperatures can provide adequate chilling. Examples of elements, which can be considered, include (but are not limited to) helium (3.2° K), hydrogen (14.2° K), and neon (24.2° K).

The proposed coolant for the present disclosure is liquid hydrogen, chosen because it is a powerful energy source, as well as a coolant. Liquid hydrogen can be pumped through the conductor thereby utilizing the transmission conductor as a means of moving large quantities of hydrogen across great distances.

With the intense interest in future fuel cell powered vehicles, businesses, residences, and other applications, a safe and efficient delivery system for large quantities of hydrogen becomes a need of paramount importance.

One approach to providing an energy transport means is to utilize the disclosed inventive system described herein which will provide for extending the length of a transmission segment up to 1,000 kilometers. This can be done in combination with the utilization of superconductivity to eliminate most of the energy loss existing in AC and DC systems presently in operation. The disclosed coaxial transmission line can be protected by three-phase AC circuit breakers the details of which will be described.

To accomplish such an extraordinary feat, the DC system must also be configured in a very special manner in order to make the interruption of the high DC current possible on the DC side. Furthermore, certain circuit components must be designed to assist in minimizing the magnitude of transient voltages generated in the DC system during switching. Previous DC circuit breakers were of the air magnetic type, which created a current zero by maneuvering the arc produced within the circuit breaker. When the contacts part and the arc moved into a chamber it was elongated and cooled. The cooling and lengthening resulted in a large increase in the resistance of the arc, which introduced a high arc voltage into the circuit. This voltage acted to reduce the DC current to zero, thereby allowing the interruption of the current. This technology is limited to DC circuits with voltage not greater than 4 kV. A new and unique method of producing a current zero is required and will be described.

The inductance of the transmission line must be reduced to the lowest possible value while not sacrificing dielectric integrity. Switching the DC circuit must include multiple circuit breakers, which are capable of interrupting the 50 kA DC current, and isolating the transmission line from the supply or load three-phase AC system at both ends of the transmission line. The system must also include current injection capability—a necessary feature required to produce a current zero in the DC system. Cancellation current is absolutely essential to the interrupting process, which requires that transient over-voltages are minimized.

The invented system to be described will require that the DC current is interrupted regardless of the direction of current flow, or the variation in the magnitude of the DC current. Furthermore, since the conductors must be super conducting, the low temperatures must be maintained by liquid hydrogen, which is, itself, a potential energy source and must be transported over long distances. We note that the detailed example presented herein describes a 50 kV above and below ground DC system wherein the voltage between the DC conductors is 100 kV. However, the technology is applicable to a wide range of voltages depending on the application and development progress on diode and thyristor technology. Higher voltages would likely allow for reduced current values, which would be fully supported by the design technology of the claimed invention.

It is the objective of this invention to assemble the transmission line components into transmission segments, which can be connected together to extend the transmission line length to make possible the delivery of both electrical and hydrogen energy to appropriate distribution locations across great distances.

Before creating the description of the transmission segment it is essential to provide details of the elements which are the basis for each component necessary to support a functioning segment.

The system to be described provides a detailed list and description of interconnected components, which comprise a segment of a hydrogen and electrical DC energy transport line. Segment lengths are selected to match the physical location of the power generation or consumption centers.

In one aspect, a direct current coaxial superconducting transmission segment is provided. The transmission segment includes a cylindrical inner superconductor defining a core. The core is adapted to flow a first coolant medium. The coaxial transmission segment further includes a dielectric insulator disposed in surrounding relation to the inner superconductor. An outer superconductor is disposed in surrounding relation to the insulator, and a cylindrical housing is disposed in surrounding relation to the outer superconductor. The housing defines a containment for a second coolant medium. The coaxial transmission segment further includes a thermal insulation barrier disposed in surrounding relation to the housing.

In another aspect, a direct current superconducting transmission system for connection to a three-phase source network is provided. The transmission system includes a coaxial transmission segment including an inner superconductor, an outer superconductor disposed in surrounding relation to the inner conductor, and a dielectric insulator disposed between the inner superconductor and the outer superconductor. A coolant medium surrounds the inner superconductor or the outer superconductor. The direct current superconducting transmission system further includes a first three phase transformer bank connected to the source network. A first poly phase rectifier/inverter is connected to the first three phase transformer bank. The rectifier/inverter is adapted to provide a positive polarity direct current voltage source to either the inner superconductor or the outer superconductor of the coaxial transmission segment. The direct current superconducting transmission system further includes a second three phase source transformer bank connected to the source network and a second poly phase rectifier/inverter connected to the second three phase transformer bank. The second rectifier/inverter is adapted to provide a negative polarity direct current voltage source to the other of the inner superconductor or outer superconductor of the coaxial transmission segment.

The proposed objective is to provide a new and unique way of transporting 50 kA DC at a voltage of 100 kV DC while minimizing or eliminating $I^2R$ losses through the use of superconductivity. The creation of a transmission segment which combines three-phase AC circuit breakers for protection and isolation with a coaxial superconducting transmission line meets the objective. The disclosed embodiment describes the 50 kA, 100 kV requirements, though any suitable voltage and current levels are contemplated within the scope of the invention.

Referring to FIG. 1, a direct current superconducting transmission system 10 includes a 5,000 megawatt coaxial transmission segment 12 coupled between terminals of a local electrical grid or network 14a. The superconducting transmission system 10 includes a 50 kV positive voltage source 16 and a 50 kV negative voltage source 18, which share a common ground 20. The 50 kV positive voltage source 16 is directly connected to an outer positive conductor 22 of the coaxial transmission segment 12, while the 50 kV negative voltage source 18 is connected to an inner negative conductor 24 of the coaxial transmission segment.

Input voltage from the network 14a is reduced to a line-to-line, non-rectified voltage of 37,065 volts by AC three-phase source transformer banks 26 and 28. The source transformer banks 26, 28 are protected by three-phase circuit breakers 30 and 32 which, when opened together, isolate the coaxial transmission segment 12 from the source network 14a. Furthermore, the local network 14a is protected by a three-phase circuit breaker 34 which provides a means of disconnecting the local network 14a from the transmission segment 12. Each transformer bank 26, 28 must be designed to provide 2500 MW DC, the design MW of the system. The transformer bank MW must be 105% of the DC system MW and provide three-phase RMS line-to-line voltage of 37,065 volts and an AC current of 40,809 amperes. These values, when rectified by a poly phase rectifier/inverter 36, will provide positive polarity DC to the segment connection terminal 16. A second poly phase rectifier/inverter 38 will provide negative polarized DC to the segment connection 18, resulting in a 100 kV difference between the coaxial conductors 22 and 24.

At the load end of the coaxial transmission segment 12, a positive 50 kV DC at a positive load terminal 40 is connected to a rectifier/inverter component 42, which inverts the DC voltage to three-phase AC voltage, which is then transformed to the system voltage by a transformer bank 44 and connected to the load network 14b by a three-phase circuit breaker 46. The negative 50 kV DC at a negative load terminal 48 is connected to a second rectifier/inverter component 50, which inverts the DC voltage to three-phase AC voltage, which is then transformed to the system voltage by a transformer bank 52 and connected to the next segment by a three phase-circuit breaker 54. The three phase combined output from the transformer banks 44, 52 are connected to the local network 14b by a second three-phase circuit breaker 56 which provides both protection and isolation from the local network.

The superconducting transmission system 10 includes auxiliary components to facilitate the superconducting properties of the coaxial transmission segment 12. In one embodiment, the transmission system 10 includes vacuum pumping systems 58a and 58b, which maintain the dielectric integrity between the coaxial superconductors. Vacuum sources having any suitable vacuum pumping technologies can be located at each end of a transmission line. There can also be optional supplementary vacuum sources along the length of the transmission line, for example, along the length of the segment 12, to maintain a desired vacuum and as well as to provide redundancy. Additional systems and components to the superconducting transmission system 10 may include one or more liquid hydrogen terminals 60, which include refrigeration, storage, and pumping units at each end, and optional additional units that may be used to maintain a prescribed temperature, such as, for example, refrigeration units along the length of the segment 12. This equipment maintains the superconducting properties of the conductors 22, 24 and advantageously transports hydrogen through the transmission segment 12 in a direction dictated by, for example, consumption and hydrogen generation requirements.

The superconducting transmission system 10 may include additional equipment to ensure coordinated functioning of all components within each coaxial transmission segment 12. In one example, a master control complex 62 analyzes data from sensors (not shown) located throughout the entire network. These sensors include, but are not limited to, the measurement of hydrogen temperature and pressure; DC current magnitude and direction of current flow; control status of the solid state rectifier/inverters 36, 38, 42, and 50; and the status of the three-phase protective network 14a and 14b and transmission segment circuit breakers 30, 32, 46, 54.

Although not illustrated in the accompanying drawings, the coaxial cable component of the transmission segment 12 must have termination assemblies designed to provide adequate insulation for the high voltage direct current, while allowing for the conductors 22, 24 to be connected to the source and load terminals. Additionally, the vacuum and liquid hydrogen conduits must be connected to external pumping and storage systems by means which are adequately insulated for the high voltage DC.

Circuit for High Voltage DC Switching

In the exemplary circuits which follow, a standard 145 kV-4 kA-63 kA SF6 transmission circuit breaker and a commercially available but modified high speed making switch were used. In some embodiments, one of the three poles of the circuit breaker 4066 (FIG. 10) was removed and replaced with a high speed making switch 4084 (MS) rated with a minimum of 50 kA DC closing capability at 50 kV. In some embodiments, one terminal of each of the circuit breaker poles and one terminal of the high speed making switch are connected together and housed in an SF6 enclosure. Depending on the interconnections to the associated equipment (source, line, rectifier) bushings on the making switch and the other end of the circuit breaker can be SF6-to-air bushings, or SF6-to-SF6 bushings.

In other embodiments, where there is a lower system voltage, a breaker having an AC rating of 72 kV or below can be used. In some such cases, the SF6 breaker can be replaced, for example, by a commercially available AC vacuum breaker. Such AC breakers typically have a continuous current ratings of up to 4000-6000 A and short circuit interrupting ratings of 63 kA, and in some cases up to 80 kA. Vacuum breakers are simpler in construction than SF6 breaker and therefore are less expensive to use.

Figure 2:
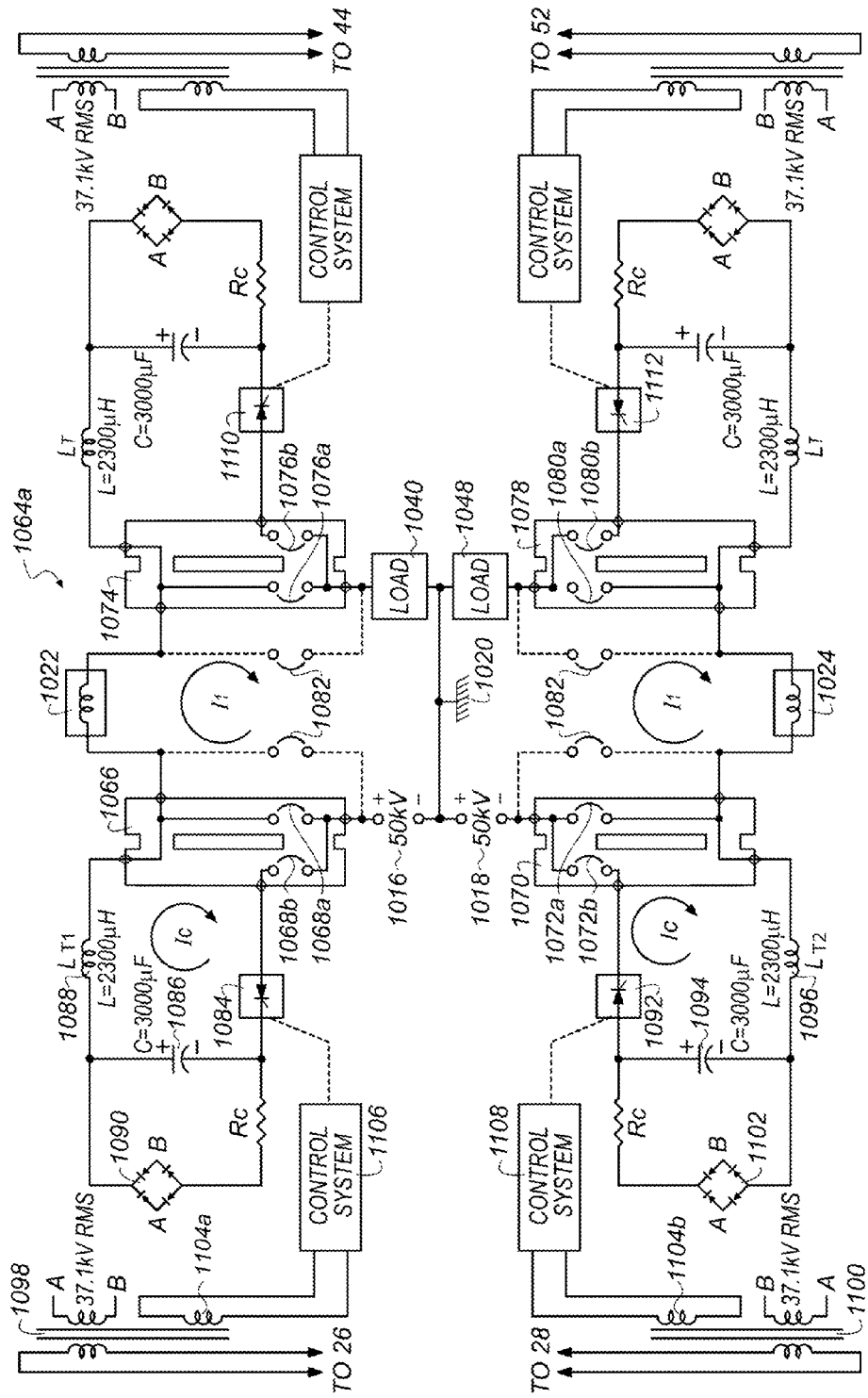
FIG. 2 depicts an electrical diagram of an exemplary embodiment of a DC coaxial superconducting system including a current injection circuit, with power being transmitted from left to right in the diagram.

Referring now to FIG. 2, wherein like numerals indicate like elements from FIG. 1, in one embodiment of the invention the superconducting transmission system 1010 includes a switching circuit 1064a to interrupt 50 kA DC at a voltage of 100 kV DC. The switching circuit 1064a is realized by the injection of a cancellation current component whose polarity and magnitude create a current zero without generating excessive transient over-voltage. In the illustrated example, the switching circuit 1064a includes two 2-pole circuit breakers and injection current sources which provide a cancellation current component whose amplitude and frequency will produce the desired current zero without generating an unacceptable transient voltage. Although the disclosed embodiment describes a 50 kV above and below ground DC system wherein the voltage between the DC conductors is 100 kV, however, the technology is applicable to a wide range of voltages depending on the application and development progress on diode and thyristor technology. Higher voltages for the same transmission capacity as described herein would allow for reduced current values, which are contemplated within the scope of the claimed invention.

The 100 kV-50 kA (5,000 Megawatt) system 1064a includes a 50 kV positive voltage source 1016 and a 50 kV negative voltage source 1018, which share a common ground 1020. The 50 kV positive source 1016 is connected to the superconductor transmission line positive conductor 1022 by a first circuit breaker 1066 containing dual interrupters 1068a and 1068b. In one example, the first circuit breaker 1066 includes a SF6-type hermetically sealed enclosure wherein the interrupter contacts are surrounded by sulfur hexafluoride gas ($SF_6$) to quench the arc produced during separation of the contacts. The 50 kV negative voltage source 1018 is connected to the superconducting transmission line negative conductor 1024 by a second SF6-type circuit breaker 1070 containing interrupters 1072a and 1072b. The transmission line conductors 1022 and 1024 may be a length in the hundreds of kilometers. The positive conductor 1022 is connected to the load 1040 by a third SF6-type circuit breaker 1074 with interrupters 1076a and 1076b. The negative conductor 1024 is connected to the load 1048 by a fourth SF6-type circuit breaker 1078 containing interrupters 1080a and 1080b. In the switching circuit 1064a, $I_1$ is the current flowing in the positive loop and $I_1$ is also the current flowing in the negative loop.

Because the two identical components flow through the shared ground conductor 1020 in opposite directions, the net current in the ground conductor is zero and the 50 kA current flows through the positive conductor 1022 and returns to the voltage source through the negative conductor 1024. The transmission line superconductors are coupled utilizing coaxial and magnetic design elements. A bypass switch 1082 may be connected in parallel with each of the circuit breaker poles 1068a, 1072a, 1076a, and 1080a. The bypass switch 1082 is preferably closed to carry the continuous current and opened prior the interruption by the dual interrupters.

Interruption with DC Cancellation Current Source

As shown in FIG. 2, the cancellation current component $I_C$ is initiated with both poles of the interrupters (e.g., 1068a and 1068b) closed and by the subsequent operation of a high current initiating device 1084 when interruption of the load current is required. Because the interruption occurs in two stages, the current $I_C$ is always polarized to flow through the circuit breaker contacts (e.g., 1068a and 1068b of first circuit breaker 1066) in a direction opposite to the load current $I_1$ and its frequency and amplitude are selected to produce a current zero, which is necessary to provide a condition wherein current interruption can occur. This current is provided in one example by a first charged capacitor bank 1086 (where C is the capacitance of the first charged capacitor bank) in combination with a first tuning reactor $L_T$ 1088. In stage one of interruption, the magnitude and the rate of rise of the current is determined by the voltage on the first charged capacitor bank 1086, as well as the value of $L_T$ 1088.

Typically, both interrupters 1068a and 1068b are closed whenever the transmission line is transmitting electric energy and not just closed for the interruption process to take place. Depending on the current rating of the system interrupters 1068a and 1068b may be bypassed by the bypass switch.

In some embodiments, where the current rating is within the single or combined rating of interrupters 1068a and 1068b, the bypass switch is not needed. For example, present SF6 circuit breaker technology would allow at least 4000 A continuous current at 145 kV without need for the bypass switch. This amounts to 400 MW system at 2×50 kVdc. Alternatively in FIG. 8, where both 3072a and 3072b are in parallel (2×4000 A), the capacity can be doubled. However, for embodiments where the system (continuous) current exceeds the continuous current rating of interrupter 1068a or the combined rating of 1068a and 1068b the bypass switch is typically used.

The voltage source shown in FIG. 2 is single phase and provides DC voltage to the capacitor bank 1086 from a first full wave bridge rectifier 1090. As an alternative, a three-phase voltage source and a three-phase rectifier can be used to achieve an increased ripple frequency and higher operating efficiency.

Simultaneously, when $I_C$ is introduced into the positive circuit (upper portion of FIG. 2), $I_C$ is introduced into the negative circuit (lower portion of FIG. 2) when interruption of the current flow is required. The current $I_C$ is initiated with the dual interrupters (e.g., 1072a and 1072b) closed and by the subsequent operation of a second high current initiating device 1092. The current $I_C$ flows through interrupters 1072a and 1072b when the interruption of the load current is required. Because the interruption occurs in two stages, the current $I_C$ is polarized to always flow through the contacts 1072a and 1072b of the second circuit breaker 1070 in a direction opposite to the load current $I_1$ and its frequency and amplitude are selected to produce a current zero which is necessary to provide a condition wherein current interruption can occur. This current is provided in one example by a second charged capacitor bank 1094 C (the capacitor bank) in combination with a second tuning reactor 1096. In stage one, the magnitude and the rate rise of the current are determined by the voltage on capacitor bank 1094, as well as the values of L. The load current positive and negative circuit breakers 1074 and 1078 both open after the source breakers 1066, 1070 therefore requiring no injection of cancellation current.

The capacitor banks 1086 and 1094 are charged to the required DC voltage from transformers 1098 and 1100 which are connected to full wave rectifier bridges 1090 and 1102. These transformers also contain additional secondary windings 1104a and 1104b to provide voltage for control circuits 1106 and 1108, respectively.

Figure 3:
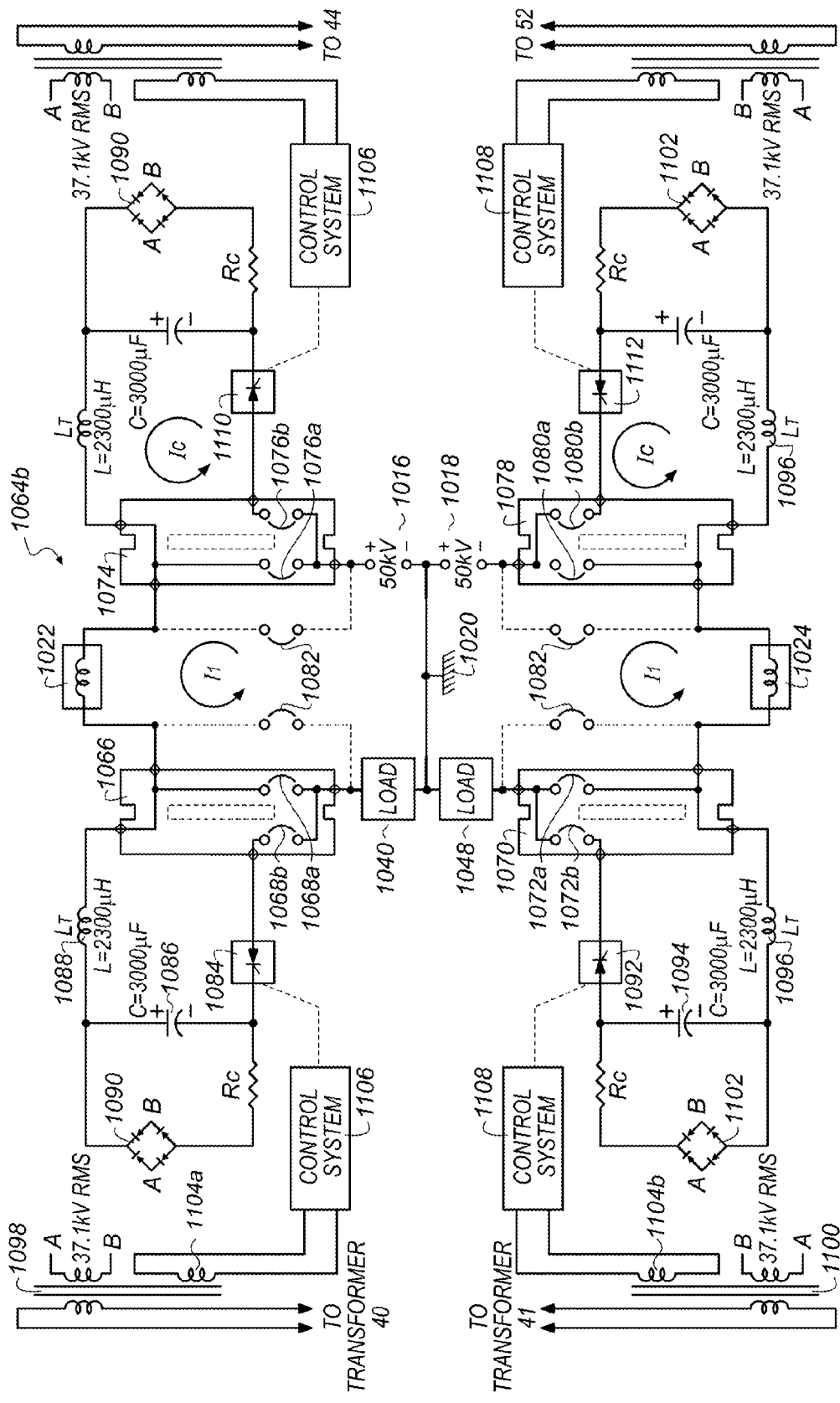
FIG. 3 depicts an electrical diagram of the DC coaxial superconducting system of FIG. 2, with power being transmitted from right to left in the diagram.

Switching circuit 1064a interrupts the load current $I_1$ by opening circuit breakers 1066, 1070, 1074, and 1078 to completely remove the long distance superconducting conductors 1022 and 1024 from any connection to either the 50 kV DC voltage sources 1016 and 1018 or the loads 1040 and 1048. In the illustrated power system 1010, it is likely that power can flow in either the direction indicated by the $I_1$ current component or that system requirements demand that current flow in the reverse direction to that shown in FIG. 2. This would mean that the 50 kV voltage sources and the loads exchange location in both the positive and negative portions of the circuit, as shown in FIG. 3. Referring to FIG. 3, to interrupt $I_1$, the contacts 1076a and 1076b of the source positive circuit breaker 1074 open and the operation of the high current capacity initiating device 1110 injects a cancellation component into the contacts 1076a and 1076b of the circuit breaker 1074. Simultaneously, in the negative voltage loop, contacts 1080a and 1080b of circuit breaker 1078 open and the operation of initiating device 1112 injects a cancellation current into the contacts 1080a and 1080b of circuit breaker 1078. The load circuit breakers 1066 and 1070 open after the source positive and negative circuit breakers therefore requiring no cancellation current.

Figure 4:
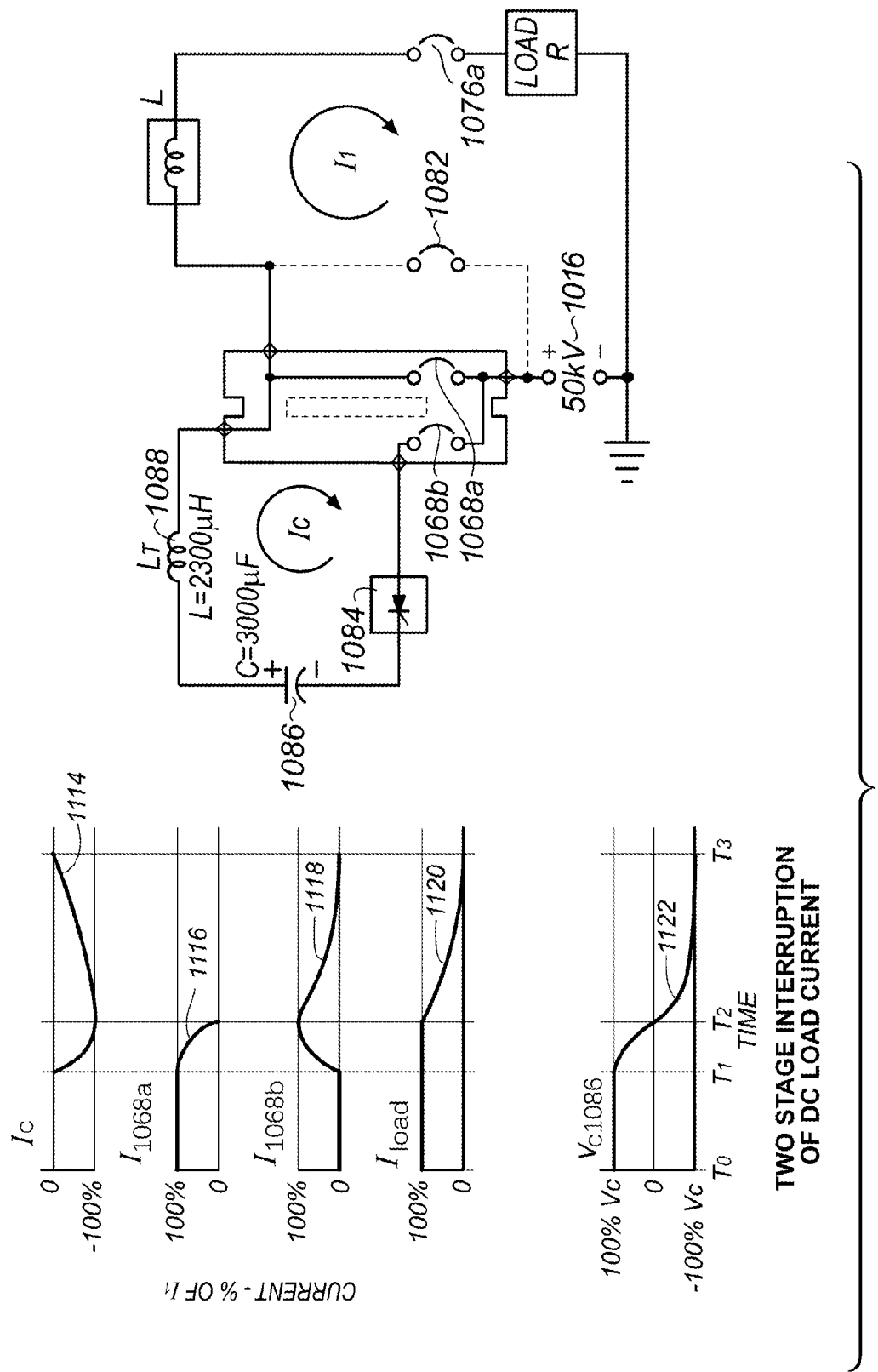
FIG. 4 depicts a detailed view of one of the four injection current circuits shown in FIGS. 2 and 3 and the circuit response.

The indication of the 50 kVDC voltage sources and loads in FIGS. 2 and 3 are symbolic of electrical interfaces, which connect the three-phase AC systems to the DC transmission system via solid state inversion/rectification circuitry. To determine the values of circuit components used in the interruption process, the circuits can be analyzed mathematically. Since the positive and negative parts of the circuit are mirror images of each other, the circuit requiring analysis is as shown in FIG. 4. The purpose of the analysis is to provide the designer of the components including the circuit breakers and the superconducting transmission conductors a clear understanding of the requirements. These requirements are centered on the control of the voltage developed by the $dI_1/dt$ within the inductance of the transmission line.

The circuit response of FIG. 4, which correlates to the circuit illustrated in FIG. 2 and utilizes a capacitor bank as cancellation current source as follows: contacts 1068a and 1068b (FIG. 2) are closed and the bypass switch 1082 has been opened, the DC load current flows unhindered through 1068a and 1068b during the period $T_0$-$T_1$ (FIG. 4). Initially, the capacitor bank 1086 have been charged to full system positive voltage $V_C$. Interrupters 1068a and 1068b are both closed prior to time T1. The graphical representation of the system performance (on the left side of FIG. 4) begins with the $I_C$ cancellation current 1114 (top trace), 1068a current 1116 (second trace), 1068b current 1118 (third trace), load current 1120 (fourth trace), and capacitor voltage $V_C$ 1122 (fifth trace). Prior to $T_1$, 1068a is tripped such that its contacts reach their maximum gap at time $T_2$. The cancellation current is applied at time $T_1$ by firing initiating device 1084. The cancellation current forces the load current in 1068a through zero allowing 1068a to interrupt the circuit at time $T_2$. During the period $T_1$-$T_2$, the voltage $V_C$ is reduced from 100% to zero at time $T_2$. 1068a and 1068b contacts part at different times with the 1068b contact opening lagging behind that of 1068a. At time $T_2$, the voltage on capacitor 1086 is approximately zero, allowing the charging current to flow through 1068b from the power source 1016 (E) through the capacitor 1086. Capacitor 1086 is now charged to a negative polarity based on circuit capacitance, inductance, and resistance, reaching a full charge at time $T_3$ at which time the current through 1068b reaches zero. 1068b will now interrupt, thereby isolating the load completely from the power source E power source 1016. After interruption of the load current by 1068b, the capacitor 1086 can be discharged and charged back to positive polarity, i.e., ready for the next opening operation. The cancellation current magnitude is not adjusted corresponding to the load current flowing in the circuit, but is always at the level which is required to interrupt the maximum rated current of the system (such as 50 kADC). Alternately, during the period T2-T3 and after 1068a has interrupted, the cancellation capacitor 1086 is charged by the load current I1 reaching a full charge at the time T3 (with no current flowing in the circuit) at which time 1068b opens and isolates the load circuit.

The mathematical analysis of FIG. 4 is as follows for the period $T_1$-$T_2$:

$$E = L\frac{di_1}{dt} + RI_1 \quad (1)$$

$$0 = L_T \frac{dI_C}{dt} + \frac{\int I_C dt}{C} \quad (2)$$

$$I_1(t) - I_C(t) \text{ for the time interval } T_0 - T_2 \quad (3)$$

Employing operational calculus, the solutions to equations (1)-(3) are as follows:

$$I_1(t) = \frac{E}{R}\left(1 - \varepsilon^{-\frac{Rt}{L}}\right) + i(0+)\varepsilon^{-\frac{Rt}{L}} \quad (4)$$

where $i(0+)$ = initial condition $$I_c(t) = \frac{-E}{\sqrt{\frac{L_T}{C}}} \sin\frac{t}{\sqrt{L_T C}} \quad (5)$$

$$I_1(t) - I_c(t) = \frac{E}{R} + \left[i(0+) - \frac{E}{R}\right]\varepsilon^{-\frac{Rt}{L}} - \frac{E}{\sqrt{\frac{L_T}{C}}}\sin\frac{t}{\sqrt{LC}} \quad (6)$$

The mathematical analysis of FIG. 4 for time $T_2$-$T_3$ can be developed using the techniques described above and including the initial conditions where $I_1$=50 kA, $V_C$=zero at time $T_2$ and the total inductance includes the inductance of the transmission line and the tuning reactor. The analysis will yield similar results showing that the current which flows to recharge 1086 will be oscillatory and at a lower frequency.

The determination of the $L_T$ and C values, based in part on the velocity characteristics of the circuit breaker contact structure, the interrupter capabilities, and the timing of the cancellation current injection by the controlled operation of the pulse current initiating device 1084. The primary consideration rests with the impact of the cancellation current $I_C$, the frequency and the resulting voltage transient generated in the inductance of the transmission line will have on the insulation capabilities of the system. This voltage transient is a direct result of the L dI/dt of the transmission line current and forces the designers of the system to minimize the line inductance and the frequency of the injected current. The invented circuit and the preceding mathematical analysis provide the means of creating an electrical system which will function as a safe and efficient solution to the energy transmission requirements of the United States as well as other countries with similar requirements.

Interruption with AC Cancellation Current Source

Figure 5:
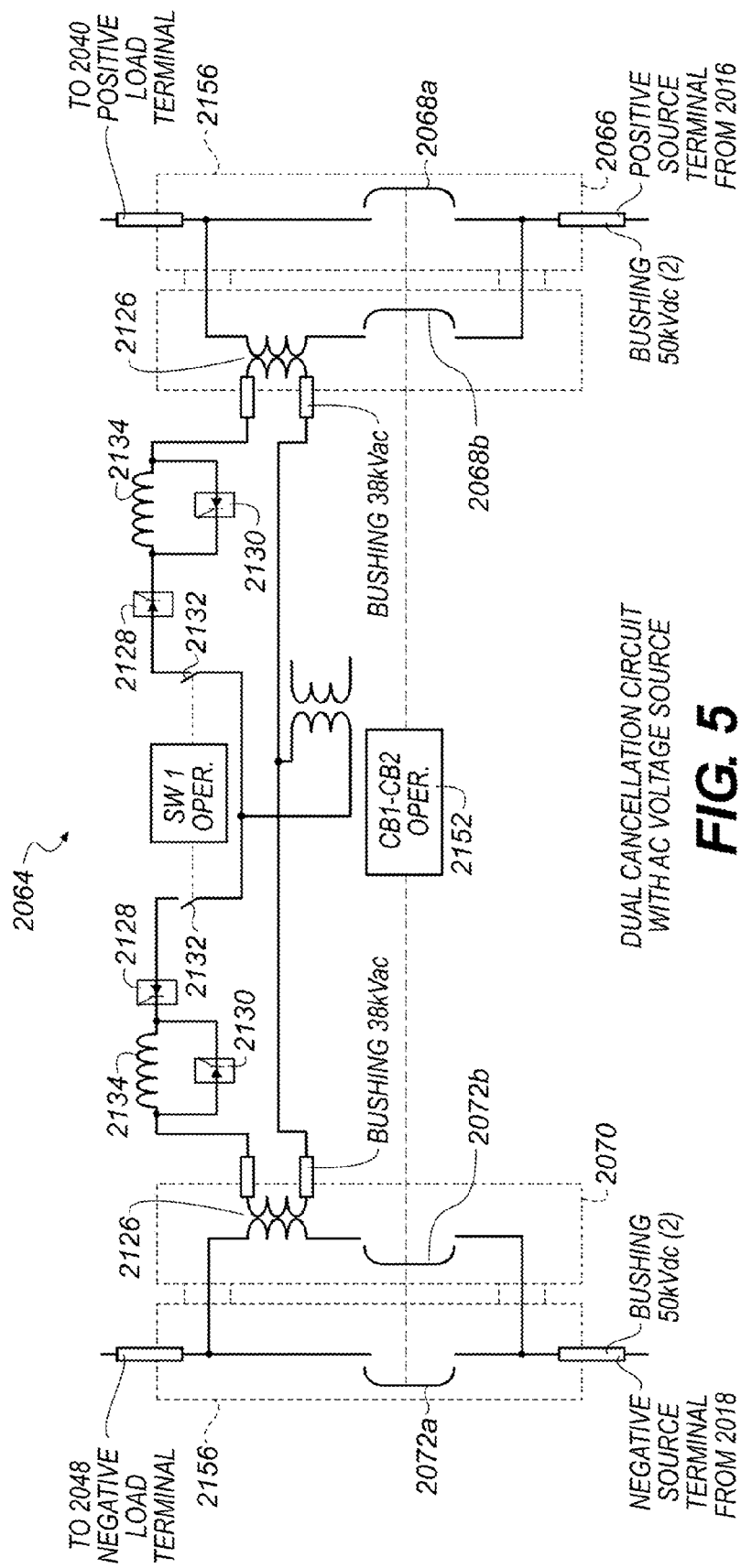
FIG. 5 depicts another embodiment of a cancellation circuit utilizing a 60 Hz AC current as the cancellation power source.

The cancellation current source disclosed above utilizes a capacitor bank discharging through a tuning reactor. However, other embodiments of providing a cancellation current source are possible without departing from the scope of the application. Referring now to FIG. 5, wherein like numerals indicate like elements from FIG. 2, a dual cancellation switching circuit 2064 is provided in which the cancellation current source is AC, such as, for example 50 Hz or 60 Hz, for cancellation current derived from the AC side of the described transmission system. This embodiment uses the same SF6 interrupters (e.g., 2068a, 2068b, 2072a and 2072b) as the cancellation circuit with the DC capacitor bank disclosed with reference to FIGS. 2 and 3, except that the current path through second interrupters 2068b and 2072b are provided with a pulse transformer 2126. The purpose of the pulse transformer 2126 is to isolate the cancellation current circuit from the DC load circuit. Secondly, two cancellation current initiating devices 2128 and 2130 and an isolation switch 2132 are required for a successful operation.

Figure 6:
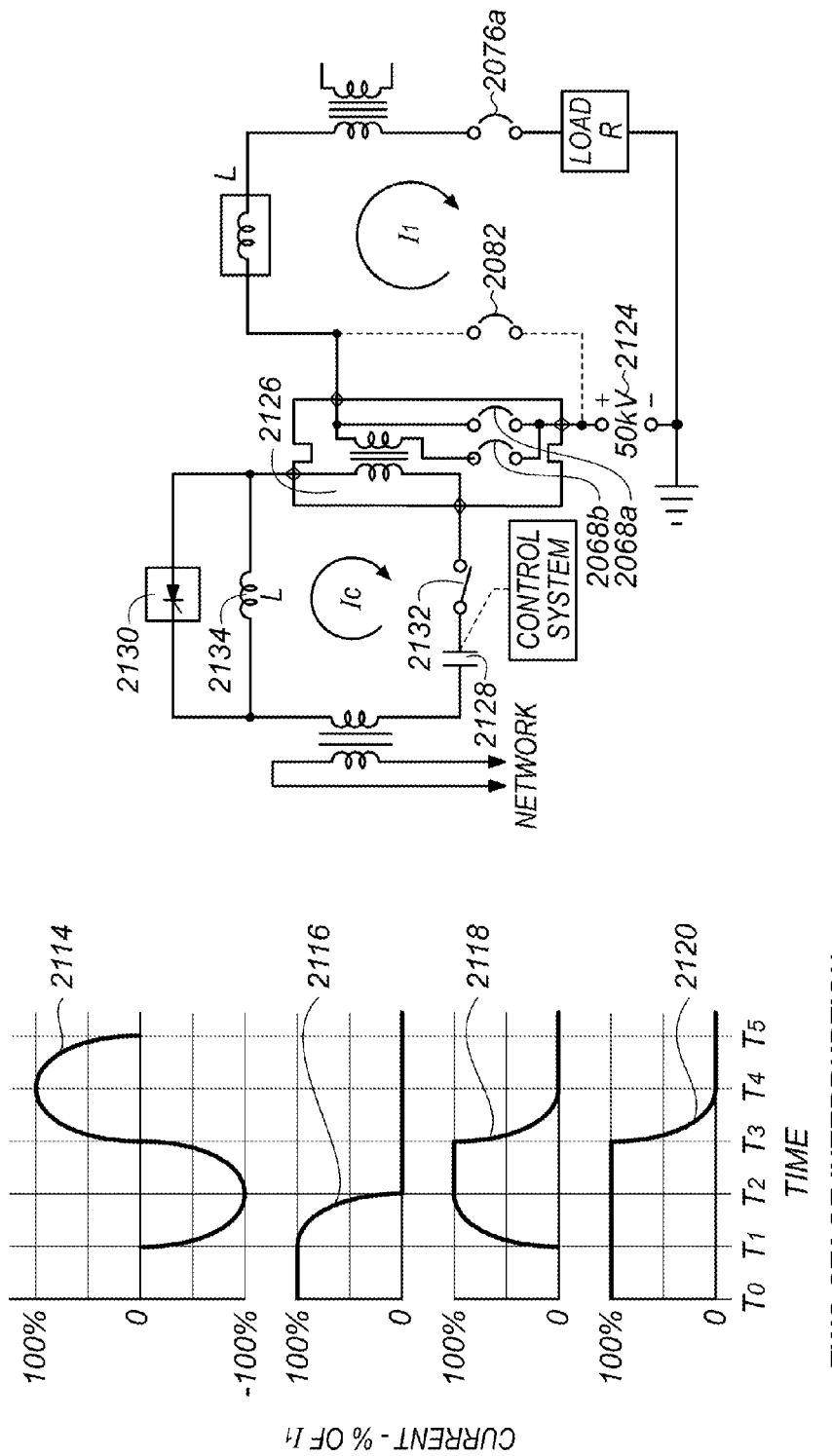
FIG. 6 depicts a load current interruption utilizing the AC cancellation current source shown in FIG. 5.

The circuit response of FIG. 5, which correlates to the circuit illustrated in FIG. 5 and utilizes a 50 Hz or 60 Hz source as cancellation current source, is shown in FIG. 6 and is described as follows: After contacts 2068a and 2068b (FIG. 5) have been closed and the bypass switch 2082 (FIG. 6) has been opened (the bypass contact structure is synchronized with the opening of the interrupters), the DC load current flows unhindered through 2068a during the period $T_0$-$T_1$. The graphical representation of the system performance for FIG. 6 begins with the $I_C$ cancellation current 2114 (top trace), 2068a current 2116 (second trace), 2068b current 2118 (third trace), and load current 2120 (fourth trace). Prior to $T_1$, 2068a is tripped such that its contacts reach their maximum gap at time $T_2$. The cancellation current is applied at time $T_1$ by firing the first current initiating device 2128 (FIG. 5). The cancellation current forces the load current in 2068a through zero allowing 2068a to interrupt the circuit at time $T_2$. During the period $T_1$-$T_2$, the current through 2068b increases from zero to 100% at $T_2$. The 2068a and 2068b contacts part at different times with the 2068b contact opening lagging behind that of 2068a. During time period $T_1$ to $T_2$ the load current transfers to 2068b and remains at 100% until time $T_3$. The second current initiating device 2130 is fired at time $T_3$, shunting the current limiting reactor 2134 and increasing the cancellation current to force the DC load current through zero at time $T_4$. The contact 2068b will now interrupt, thereby isolating the load completely from the power source 2124 (E). The cancellation current, which is at a peak at time $T_4$, will be interrupted by isolation circuit breaker 2132 at a subsequent current zero.

High Voltage DC Coaxial Superconducting Power & Hydrogen Transport System

A prior art DC system which was disclosed in a 2006 Scientific American article included two super-conducting cables, each at a potential of 50 kV (one cable positive, and the other negative) relative to ground, and each carrying a current of 50 kA. The superconductors of the prior art cables were described as having an outside diameter of 47.6 cm separated by a center line distance of 78 cm. We analyzed the arrangement to determine its properties, which include the inductance L per kilometer, the magnetic force between the conductors, the stored energy of the pair per kilometer, and the generated transient voltage created during switching.

The inductance L per kilometer of the prior art cable was calculated as follows:

$$L = \frac{\mu_0 l}{\pi} \ln\left[\frac{d}{R} + \frac{1}{4} - \frac{d}{l}\right] = 504.12 \; \mu H \text{ per kilometer;} \quad (7)$$

where L=inductance=$\mu_{Henries/meter}$;
l=length (meters);
d=separation (cm)=78 cm;
R=conductor radius (cm)=23.8 cm; and
$\mu_0 = 4\pi \times 10^{-7}$ The magnetic force between the conductors was calculated as follows:

$$F = (B)(I)(Z) = 65.38 \text{ kiloponds/meter;} \quad (8)$$

where $$B = \frac{\mu_0 2I}{4\pi d};$$

I=50 kA; Z=1 meter; and d=78 cm

The stored energy of the pair in 1 kilometer of cable was calculated as follows:

$$E = \tfrac{1}{2}(L)(I)^2 = 630{,}150 \text{ Ws;} \quad (9)$$

where L=504.12 µH per km and I=50 kA

The peak transient voltage generated in 1 kilometer of cable was calculated as follows:

$$V_{PK} = L\frac{dI}{dt} = 504.12 \times 10^{-6} \times 78.5 \times 10^3 = 39{,}573 \text{ volts} \quad (10)$$

where the current is a sinusoid 318 Hz

The prior art system has several disadvantages, the first being that the calculated inductance L is 504.12 pH per kilometer. This high value results in a stored energy level of 630,150 Ws in only 1 km of cable, and a circuit breaker attempting to interrupt the 50 kA DC current would have to absorb this energy and sustain 39,573 Volts. Another disadvantage of the prior art system is that the magnetic force between the conductors would be 65.38 kiloponds per meter, and the very intense magnetic field surrounding the cables could impose severe unintended consequences on electronic devices in close proximity.

The calculations show the extreme difficulty in attempting to switch a cable of only one kilometer in length. Building current interrupters in a system using a 50 kA load level and parallel DC conductors whose length must exceed thousands of kilometers becomes impossible.

Figure 7:
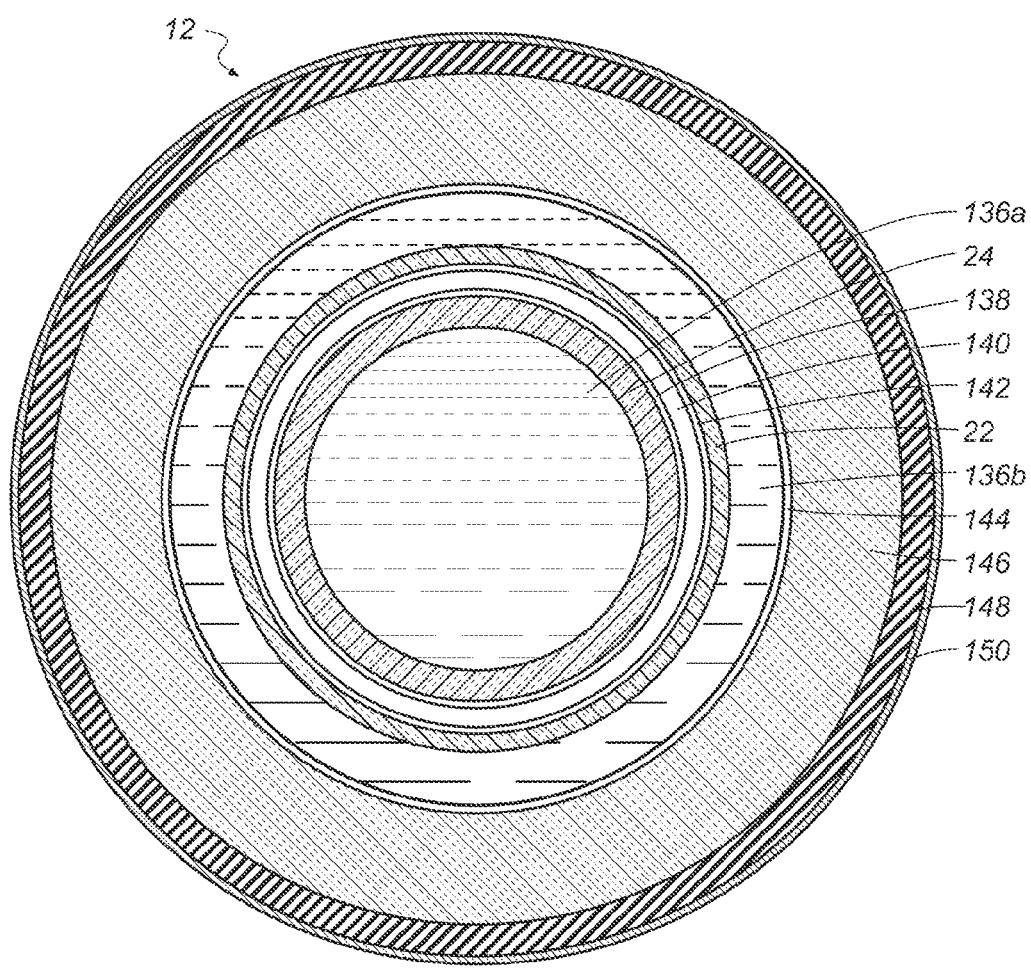
FIG. 7 depicts a cross section of the coaxial transmission segment shown in FIG. 1.

The inventors have surmised that part of the solution to this problem is to build a transmission line with a small inductance value and no external magnetic field. The inventors have determined that a coaxial cable design meets this objective. Referring now to FIG. 7, a cross section of the coaxial transmission line superconducting cable 12 of FIG. 1 is illustrated. The coaxial transmission segment 12 includes a liquid hydrogen core 136a at a temperature of 32 degrees Kelvin. The liquid hydrogen core 136a is in physical contact with the inner (negative) superconductor 24. The inner superconductor 24 is chilled by the liquid hydrogen to insure that the superconducting properties are maintained. The superconductor cylinder 24 is encased within a non-magnetic stainless steel inner cylinder 138, which acts as a protective coating and as the electrostatic surface of the conductor. An insulator 140 is provided by a vacuum between the inner cylinder 138 and a similarly constructed outer cylinder 142, which is in contact with the outer (positive) superconductor 22. The outer superconductor 22 is also in direct contact with liquid hydrogen 136b which functions as a coolant medium for superconductor 22. The two conductors 22, 24 are the current carrying members of the transmission line superconducting transmission system 10 illustrated in FIG. 1, the negative conductor 24 being at 50 kV DC below ground potential and the positive conductor 22 being at 50 kV DC above ground potential. The vacuum space 140 will experience an electric stress of 100 kV DC and this space is sized to sustain this voltage as well as any transient over-voltages generated during switching.

The detailed example presented herein describes a 50 kV above and below ground DC system wherein the voltage between the DC conductors is 100 kV. The disclosed technology is applicable to higher voltages as dictated by system requirements and development progress on diode and thyristor technology. Higher voltages would likely allow for reduced current values which would be fully supported by the design technology of the application.

The liquid hydrogen coolant 136b which is in contact with the outer superconductor 22 is contained within a non-magnetic cylindrical housing 144. A thermal insulation barrier 146 is provided to reduce heat penetration to an acceptable level. High voltage insulation 148 encloses the entire multi-layer core to eliminate any possible dielectric failure between the positive conductor 22, which is at 50 kV above ground potential, and which is the voltage level of the external stainless housing 150.

where B is the magnetic flux density weber/meter$^2$, $\lambda$ is the flux density=IL, where I is the current in the conductor in amperes and L is the inductance in Henries, and A is the area containing the magnetic flux in square meters;

$$B = \frac{IL}{A}, \tag{13}$$

$$F = (B)(I)(Z) = BI \text{ where } Z = 1 \text{ meter} = \text{Newtons/meter}, \tag{14}$$

TABLE 1

| Element | Function | Material | Area (cm$^2$) | ID (cm) | OD (cm) | Thickness |
|---|---|---|---|---|---|---|
| 136a | Coolant | Liquid Hydrogen Coolant | 1256.64 | — | 40.00 | |
| 24 | Superconductor | Copper Oxide, Niobium Tin, etc. | 522.89 | 40.00 | 47.60 | 3.8 cm |
| 138 | Vacuum Containment | Stainless steel, non-magnetic | — | 47.60 | 48.60 | 0.5 cm |
| 140 | Vacuum space | Vacuum | — | 48.60 | 53.20 | 2.3 cm |
| 142 | Vacuum Containment | Stainless steel, non-magnetic | — | 53.20 | 54.20 | 0.5 cm |
| 22 | Superconductor | Copper Oxide, Niobium Tin, etc. | 522.89 | 54.20 | 58.83 | 2.313 cm |
| 136b | Coolant | Liquid Hydrogen Coolant | 1256.64 | 58.83 | 71.14 | 6.156 cm |
| 144 | Hydrogen Containment | Stainless steel, non-magnetic | — | 71.14 | 72.14 | 0.5 cm |
| 146 | Thermal Insulation | — | — | 72.14 | 99.54 | 13.7 cm |
| 148 | High Voltage Insulation | — | — | 99.54 | 105.54 | 3.0 cm |
| 150 | Protective Outer Shell | Stainless steel | — | 105.54 | 106.54 | 0.5 cm |

Table 2 provides exemplary properties of the superconducting coaxial cable 12. Values were derived from the following equations:

Beginning with the inductance per kilometer L for a tube having an outer radius b and an inner radius a, $$L = 0.2Z\ln\frac{b}{a} = 0.2\ln\frac{27.1}{23.8} = 0.2\ln 1.13866 = 25.97 \;\mu\text{H/km}, \tag{11}$$

where Z=1 meter

Additional defining properties can be calculated once a set of dimensions has been selected. These properties are as follows:

The magnetic force between the conductors was calculated as follows:

$$B = \frac{\lambda}{A}, \tag{12}$$

$$F = 1.02 \times 10^{-1} \times (B)(I) \text{ kiloponds/meter} \tag{15}$$

The stored energy in Watt second/kilometer of cable was calculated as follows:

$$E = \tfrac{1}{2}LI^2, \tag{16}$$

where L=inductance/kilometer and I=line current in Amperes

A comparison can be made of various coaxial cable designs, as shown in Table 2. When the properties of the inventive coaxial cable are compared with the two parallel DC conductor design of the prior art, it is clear that the coaxial design is a superior choice. Table 2 shows that the stored energy of the No. 4 coaxial design—the details of which are provided in Table 1—is only 5.15% of the parallel conductor stored energy.

TABLE 2

| Design No. | Type | Inductance (µH/meter) | Inductance (µH/km) | Magnetic Force (kpounds/m) | Stored Energy (watt sec/km) | Energy % |
|---|---|---|---|---|---|---|
| Prior Art | Parallel Cable | 0.50412 | 504.120 | 65,385.0 | 630,150.0 | N/A |
| 1 | Coaxial | 0.01520 | 15.198 | 52.05 | 18,997 | 3.01 |
| 2 | Coaxial | 0.01613 | 16.130 | 131.982 | 20,162.5 | 3.20 |

TABLE 2-continued

| Design No. | Type | Inductance (μH/meter) | Inductance (μH/km) | Magnetic Force (kpounds/m) | Stored Energy (watt sec/km) | Energy % |
|---|---|---|---|---|---|---|
| 3 | Coaxial | 0.01906 | 19.062 | 128.42 | 23,827.5 | 3.78 |
| 4 | Coaxial | 0.02597 | 25.970 | 180.0 | 32,462.5 | 5.15 |

The superconducting coaxial cable 12 shown and described in FIG. 5 and Tables 1 and 2 meet all of the following design requirements:

a. The cable carries 50 kA to and from the load with minimal $I^2R$ losses;
b. The cable is free of an external magnetic field which could impose severe unintended consequences on the electronic devices in the vicinity of the cable;
c. The conductors must be insulated from each other in order to sustain the operating voltage, as well as voltage transients, generated during switching. The evacuated space 140 provides this insulation;
d. The cable is designed with a very low inductance, which is of primary importance in switching the current off without generating unmanageable high voltage transients;
e. The cable provides a means of transporting large quantities of liquid hydrogen over long distances; and
f. The cable transmission segment presents an aesthetically pleasing appearance and does not occupy a large area of real estate, such as is the case of the 765 kV transmission towers stretching across the landscape mile after mile. The exemplary cable is a 107 cm (42.1 inch) diameter pipeline, and may be painted to blend into the surrounding environment or buried underground.

Circuit Breaker/Pulse Current Initiating Device Description

Figure 8:
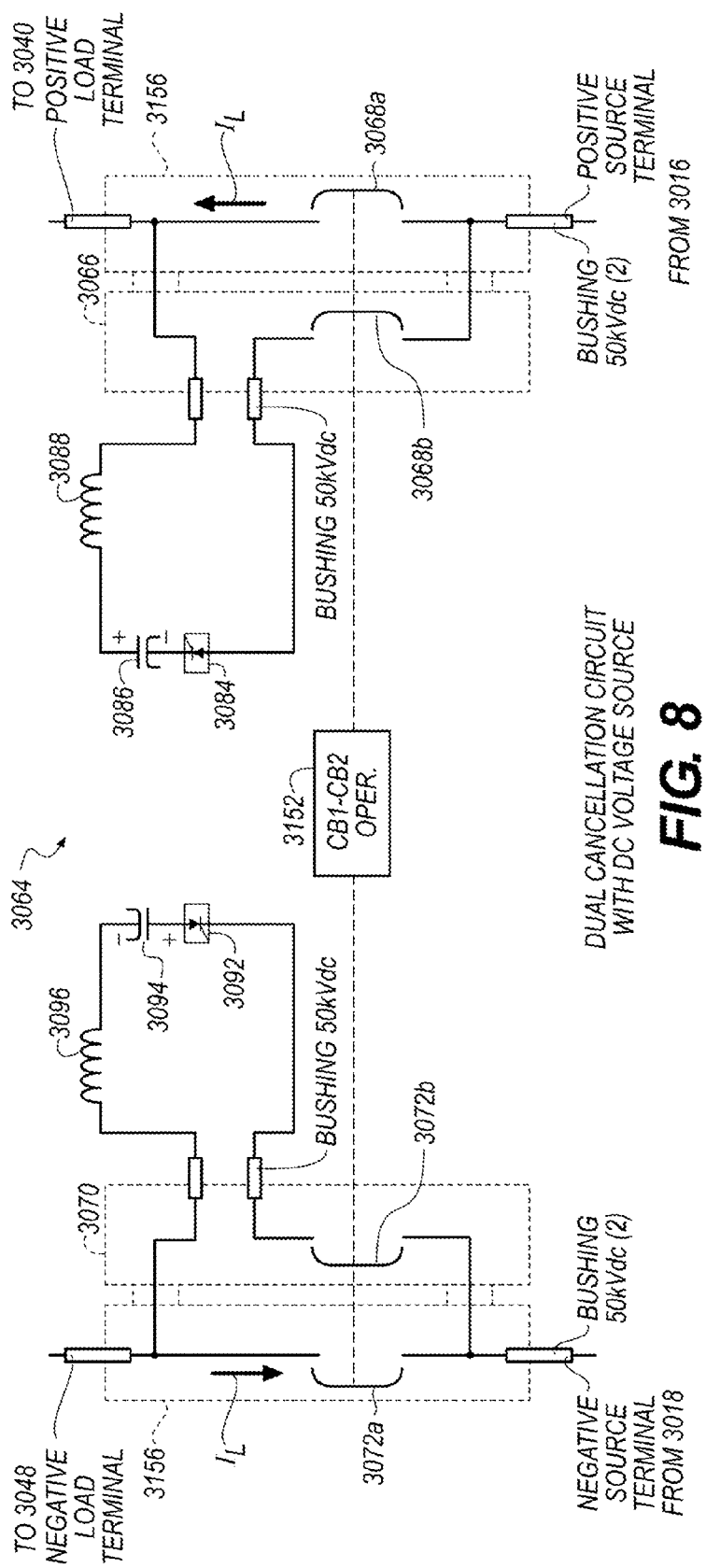
FIG. 8 depicts a switching circuit according to another embodiment of the invention.

Referring now to FIG. 8, wherein like numerals indicate like elements from FIG. 2, one embodiment of a switching circuit 3064 is illustrated wherein the interrupters are operated by a common mechanism. The interrupting contact structures 3068a (+) and 3072a (−) are enclosed in individual SF6 filled tanks 3066 and 3070, respectively. The interrupters in each SF6 enclosure are controlled by a common operator 3152. In the illustrated example, the source of the cancellation current consists of capacitor banks 3086 and 3094 and high capacity cancellation current initiating devices 3084 and 3092, which in one embodiment are realized as high capacity thyristors.

The capacitor banks 3086 and 3094, though not enclosed, may be mounted on grounded frames and interconnected externally to complete the circuit. If installed outdoors, weatherproof compartments enclose the high capacity silicon controlled rectifiers (SCR) 3084 and 3092.

The corresponding dual cancellation switching circuit 2064 adapted for AC cancellation current source was depicted in FIG. 5. This alternative requires a pulse transformer 2126, which is mounted in the SF6 interrupter 2070 enclosure, to isolate the cancellation current circuit from the DC load circuit. As described above, the current limiting reactor 2134, the 2-stage cancellation current initiating device and the isolation switch 2132 are required for the correct operation of the circuit. The interrupter requirements (e.g., 2068a, 2068b, 2072a, and 2072b) are the same as in the circuit utilizing a DC capacitor bank as the cancellation current source.

Figure 9A:
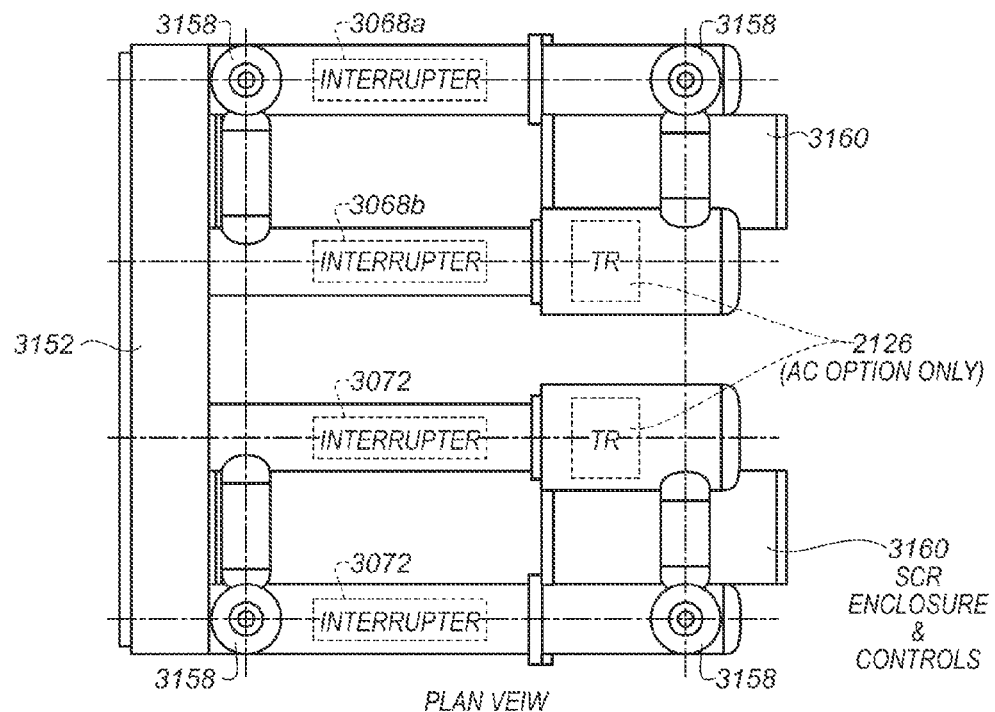
FIGS. 9a and 9b depict an installation plan view and side view, respectively, of the switching circuit shown in FIG. 8.
Figure 9B:
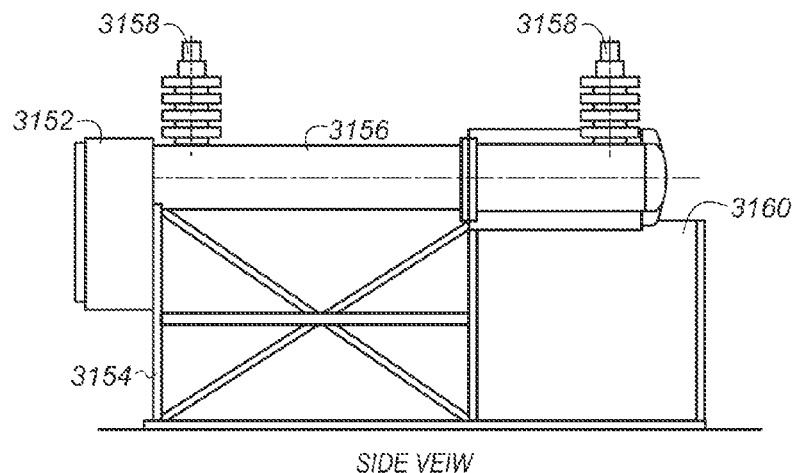

FIGS. 9a and 9b respectively depict a plan view and a side view of an exemplary installation of the switching circuit described in FIGS. 5 and 8. The installation includes a frame structure 3154 upon which components of the switching circuit are mounted. In one example, the interrupters are hermetically sealed in a SF6-type enclosure 3156 wherein the interrupters are surrounded by $SF_6$ gas for insulation and to quench the arc produced during separation of the contacts. The interrupters are coupled by the operator 3152. The installation may include $SF_6$-to-air or SF6-to-SF6 bushings 3158 to allow the enclosed switching circuit to be connected to the bare terminals of the source terminal and line terminal. Any suitable insulator can be used. One especially suitable insulator, SF6 is about a 5 times better insulator than air, which allows for a reduction of dielectric distances to ⅕ of those needed in air. Insulators such as SF6 allow for a considerable reduction in the physical size of the equipment. The installation may further include an enclosure or cabinet 3160 for the controls, hardware and the initiating devices (e.g., thyristor 3084). Note the pulse transformers 2126 for AC cancellation current source are enclosed in the 3068b and 3072b enclosures 3156.

Figure 10:
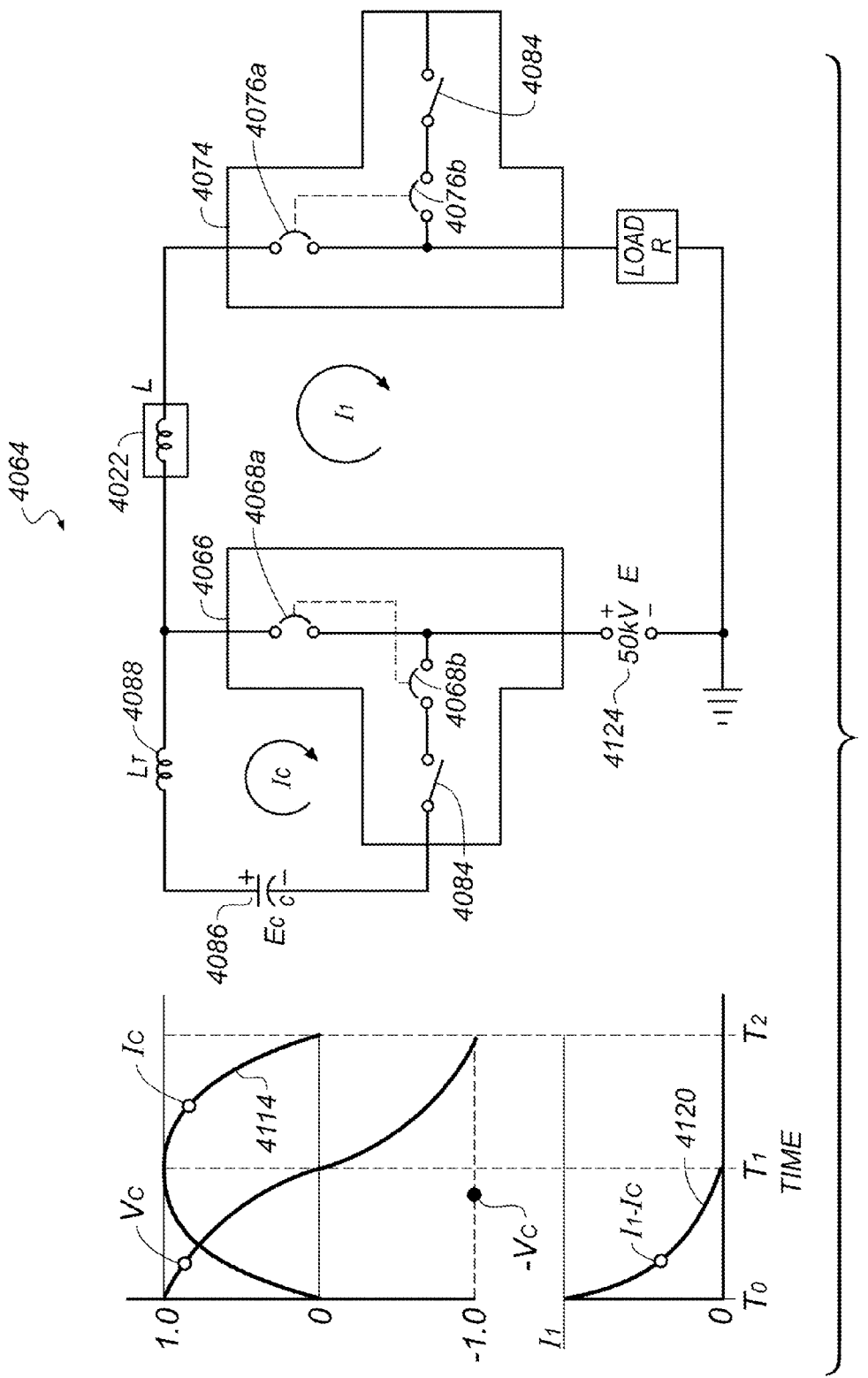
FIG. 10 depicts another embodiment of an injection current circuit.

FIG. 10 depicts another embodiment of a switching circuit 4064 and associated response. The circuit 4064 may be utilized in place of the circuit 1064a disclosed in FIG. 2, and the current cancellation source may include the same charged capacitor bank 1086, tuning reactor 1088, and full wave bridge rectifier 1090 disclosed in reference to FIG. 2. As described hereinabove, the exemplary design of FIG. 10 uses a standard 145 kV-4 kA-63 kA SF6 transmission circuit breaker and a commercially available but modified high speed making switch. One of the three poles of the circuit breaker 4066 (FIG. 10) is removed and replaced with a high speed making switch 4084 (MS) rated with a minimum of 50 kA DC closing capability at 50 kV DC. One terminal of each of the circuit breaker poles and one terminal of the high speed making switch are connected together and housed in an SF6 enclosure. Depending on the interconnections to the associated equipment (source, line, rectifier) bushings on the making switch and the other end of the circuit breaker may be $SF_6$-to-air bushings, or $SF_6$-to-$SF_6$ bushings.

In this embodiment, the interrupting contact structures 4068a and 4068b of circuit 4064 are connected in parallel, except that 4068b is connected in series with the making switch 4084 by a common $SF_6$ insulated conductor housed in a tank which is further connected to the two tanks which house 4068a and 4068b, respectively. The making switch is connected in series with the capacitor 4086 and the inductor 4088, the second terminal of the inductor being connected to the second terminal of 4086a. Not shown in FIG. 10 is a bypass switch in a parallel contact structure designed to carry 50 kA continuously. The contacts of the bypass switch open prior to the parting of the interrupting contacts, thus commutating the current into the interrupting structure 4068a and 4068b. In all other respects, the operation of the circuit 4064 within the system is the same as embodiments previously described.

The response of the circuit 4064 is shown on the left side of FIG. 10, and is described as follows: Capacitor bank 4086 is charged to a voltage $E_C$ sufficient to produce a cancellation current $I_C$ 4114 whose magnitude matches the $I_1$ loop current magnitude. Contacts of circuit breaker 4068a part at time $T_0$ beginning the interruption process of the load current $I_1$. The parting of the contacts creates an arc which must be extinguished at a current zero, but time is required both to obtain contact separation and to move the arc into a contact space which can sustain the generated transient recovery voltage at time $T_1$. Making switch 4084 closes its contacts at $T_0$ initiating $I_C$ current flow through the contact 4068a in the opposite direction of the $I_1$ loop current. The magnitude and frequency of the cancellation current $I_C$ is dictated by the values of capacitor bank 4086, the tuning reactor 4088, and the source voltage 4124. The $I_C$ current 4114 will reach its maximum value at time $T_1$ and will produce a current zero in the circuit breaker contact 4068a at which time ($T_1$) interruption of the $I_1$ current will occur. The current 4120 flowing through the transmission line conductor 4022 will be $I_1$-$I_C$ during the time interval from $T_0$ to $T_1$ and the maximum $dI_1/dt$ will occur at $T_0$, and will be the slope of the $I_C$ sine wave generated by the capacitance 4086 and the inductance 4088. The $I_C$ current 4114 will experience a natural current zero at time $T_2$ and will be interrupted by the circuit breaker contact 4068b.

The mathematical analysis of FIG. 10 is the same as Equations (1) through (6) presented above.

Description of a Transmission Line Segment

Figure 11:
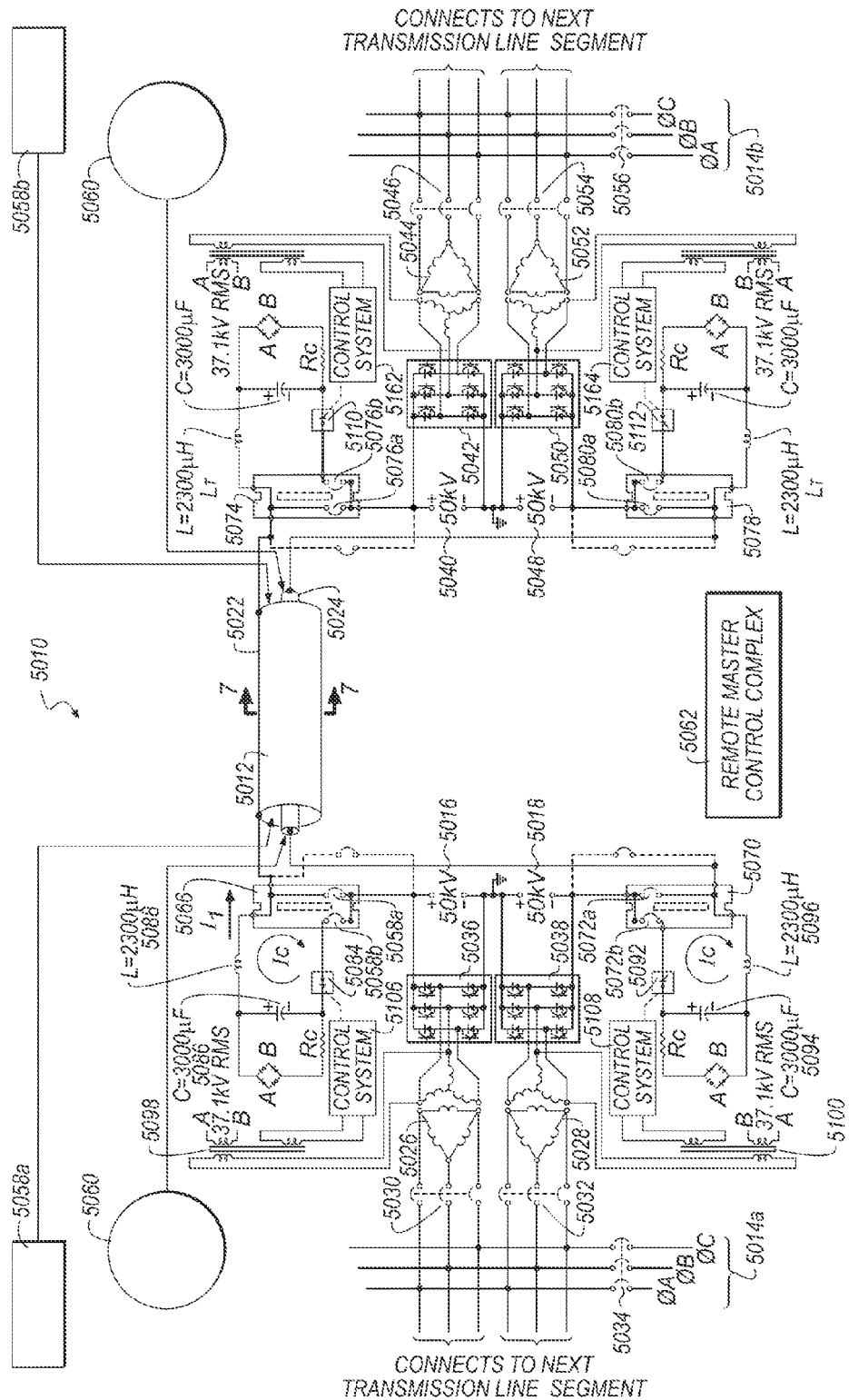
FIG. 11 depicts an electrical diagram of an exemplary embodiment of a superconducting transmission system utilizing a DC capacitor bank as the cancellation power source, with power being transmitted from left to right in the diagram.

The detailed components of the exemplary superconducting transmission system disclosed herein may now be described in detail as an interconnected system comprising a segment of a hydrogen and electrical energy transport line. The objective is to provide coaxial transmission segments whose lengths can be selected to match the physical location of the power generation or consumption centers across the country. FIG. 11, wherein like numerals indicate like elements from FIGS. 1 and 2, depicts an exemplary superconducting transmission system 5010 and illustrates all segment components as well as the location of each component within the electrical circuit. A complete description is provided for each component and will include the required explanation for the selection of materials and/or dimensions.

In the descriptions to follow, the objective size of a transmission segment shall be 1,000 kilometers (620 miles) in length, but segments of lesser length can be designed as requirements demand. Furthermore, the initial description of the operation of the system is based on power being generated on the left side of the circuit shown in FIG. 11 and delivered to the load side (right) of the circuit. Provisions have been included in the invented circuit for power to flow from right to left and this mode of operation is shown and described in FIG. 12.

The description of the primary elements which comprise the building blocks for the creation of a superconducting transmission system clearly defines the capabilities of each component, and includes but is not limited to the aforementioned descriptions in the sections "CIRCUIT FOR HIGH VOLTAGE DC SWITCHING", "TRANSMISSION LINE SEGMENT", and "CIRCUIT BREAKER/PULSE CURRENT INITIATING DEVICE". The operation of the system will now be examined.

Referring to FIG. 11, the input voltage from the AC three phase source transformer banks 5026 and 5028 is reduced to the line to line non-rectified voltage of 37,065 Volts. The source transformer banks are protected by three phase circuit breakers 5030 and 5032 which, when opened together, isolate the segment from the source network 5014a. Furthermore, the local network is protected by the three phase circuit breaker 5034, which provides a means of disconnecting the local network 5014a from the transmission line segment coaxial transmission segment 5012. Each transformer bank must be designed to provide 2500 MW DC, the design MW of the system. The bank MW must be 105% of the DC system MW and provide three phase RMS line-to-line voltage of 37,065 V RMS and a current of 40,809 A AC. These values when rectified by the poly phase rectifier/inverter 5036 will provide positive polarity DC to the segment connection terminal 5016. The poly phase rectifier/inverter 5038 will provide negative polarized DC to the segment connection negative voltage source 5018. This will result in a 100 kV difference between the coaxial conductors 5022 and 5024.

The transmission line segment 5012 is energized by simultaneous operation of two, 2-pole circuit breakers 5066 and 5070 at the energy source end of the segment and by the simultaneous operation of single interrupter circuit breakers 5074 and 5078 at the load end of the segment. Note that all four circuit breakers must be interlocked to operate simultaneously whether opening or closing.

At the load end of the segment, the positive 50 kV DC at terminal 5040 is connected to the rectifier/inverter component positive rectifier/inverter component 5042 which will invert the DC voltage to three phase AC voltage which is then transformed to the system voltage by transformer bank 5044 and connected to the load network 5014b by three phase circuit breaker 5046. The negative 50 kV DC at terminal 5048 is connected to the rectifier/inverter component 5050 which will invert the DC voltage to three phase AC voltage which is then transformed to the system voltage by transformer bank 5052 and connected to the next segment by three phase circuit breaker 5054. The three phase combined output from the transformer banks 5044 and 5052 are connected to the local network 5014b by a three phase circuit breaker 5056 which provides both protection and isolation from the local network.

When circuit interruption is required, the cancellation current must be created and injected into both the positive and negative circuits at the source end of the segment. This process is fully described and selection of the individual circuit components is analyzed since such choices have a direct impact on the ultimate length of the segment.

To determine the values of circuit components which are important to the successful completion of the interruption process, the circuits must be analyzed mathematically. Since the positive and negative parts of the circuit are mirror images of each other, the circuit requiring analysis is as shown in FIG. 4, described in detail previously. The purpose of the analysis is to provide the designer of the components including the circuit breakers and the superconducting transmission conductors a clear understanding of the requirements. These requirements are centered on the control of the voltage developed by the $dI_1/dt$ within the inductance of the transmission line.

Examination of the components of FIGS. 4 and 11 are described as follows:

TRANSFORMER—The devices 5098 and 5100 shown in FIG. 11 are depicted as single phase transformers, but would in practice be three-phase units, thereby making polyphase rectifiers available to supply DC to charge the capacitor banks. Furthermore, the size (i.e. kVA) of the transformer is small since it is only required to supply charging current to the capacitor bank. The impedance is not a factor, so the designer can easily provide the necessary insulation to sustain the 50 kV DC plus generated transient voltages previously described. Also, an additional winding can be provided in transformers 5098 and 5100 for control power for the control systems 5106 and 5108 as well as auxiliary devices including the high current making switch (e.g., switch 5084 and 5092).

circuit breaker 5066 and 5070. The inductance will also provide a blocking element to voltage transients generated by the dI/dt of the load current in the transmission line during current interruption.

FREQUENCY—Utilization of a low voltage capacitor bank provides a realistic opportunity to examine the advan-

TABLE 3

| Calc. No. | $E_C$ | Freq. (Hz) | $\sqrt{LC}$ | $\sqrt{\dfrac{L}{C}}$ | LT2µH | C (µF) | $T_1$ (sec) | Cap. Vol. (m³) |
|---|---|---|---|---|---|---|---|---|
| 1 | 52500 | 60 | 2652 x 10⁻⁶ | 1.05 | 2785 | 2526 | 4.17 x 10⁻³ | 26.174 |
| 2 | 52500 | 30 | 5305 x 10⁻⁶ | 1.05 | 5570 | 5052 | 8.33 x 10⁻³ | 52.348 |
| 3 | 52500 | 25 | 6366 x 10⁻⁶ | 1.05 | 6684 | 6063 | 10.00 x 10⁻³ | 62.824 |
| 4 | 52500 | 20 | 7955 x 10⁻⁶ | 1.05 | 8355 | 7570 | 12.5 x 10⁻³ | 78.532 |
| 5 | 52500 | 17.5 | 9095 x 10⁻⁶ | 1.05 | 9549 | 8662 | 14.9 x 10⁻³ | 89.754 |

Notes:
(1) For calculation No. 3, R = 1155 ohms - 21 seconds to charge
(2) L = 0.1671/Hz = µH
(3) C = 0.90703 x L = µF; L is in µH
Where $E_C$ is voltage on capacitor bank 5086 in FIG. 11 and $T_1$ is time to $I_C$ peak CAPACITOR BANK—The bank must be constructed using energy storage capacitors because of high current output and the reversal of polarity during discharge. Table 3 presents capacitor bank estimated volume in cubic meters based on manufacturer's data indicating 0.133 Joules per cm³.

HIGH CAPACITY CURRENT INITIATING DEVICE—Several switching devices are selected for initiating current flow from the capacitor bank. A high current making switch which exhibits rapid and consistent closing time and the ability to handle high current magnitudes associated with this application is commercially available. One exemplary make switch available from ETNA Industrie, France is rated 36 kV RMS and 80 kA RMS (200 kA Peak) with a closing time of less than 10 milliseconds. An additional solid state device consisting of two banks of back-to-back high capacity commercially available thyristors capable of sustaining current magnitudes involved and can be triggered, and thus provide very precise timing essential to the initiation of the cancellation current pulse.

REACTOR—The inductance of the tuning reactors 5088 and 5096 may be realized by an iron core reactor designed to discharge a capacitor bank whose capacitance value, when matched with the inductance, will produce a frequency and sustain a current magnitude necessary to produce a current zero in the contact structure of circuit breakers first tages of using injection current pulses at frequencies below 60 Hz. The importance of this was recognized in calculations of generated peak transient voltage during interruption of transmission line current.

To complete the design of the coaxial transmission segment 5012, the relationship between the injection current and the segment length must be determined. Table 4 presents segment lengths for several injection frequencies, calculated using the foregoing formulas. In this table, the peak transient voltage (150 kV) generated by the injection current's impact on the load current $I_1$ which is inducing voltage within the inductance of the coaxial line conductors, a segment length in excess of 1,000 kilometers can be achieved with an injected current frequency of 17.5 Hz. Note that at 17.5 Hz the segment length is increased to 1052.21 kilometers, thereby reducing the number of interconnected segments to five, with six terminal points. This is an enormous improvement and opens many opportunities to the system designers. One can envision a primary transportation system linking San Francisco, Calif., with Boston, Mass. with tap connections extending to metropolitan areas, such as Dallas, Houston, Chicago, and Atlanta, etc.

TABLE 4

LINE SEGMENT LENGTH VS FREQUENCY.
Transient Voltage Limited to 150 kV Peak

| Calc. No. | Freq. (Hz) | T = 1/f (ms) | L (µH/km) | T/4 (ms) | di/dt Note 1 | L di/dt = (Volts) | Segment Length (km) |
|---|---|---|---|---|---|---|---|
| 1 | 318 | 3.14 | 16.13 | 0.7862 | 10.0 x 10⁶ | 150 x 10³ | 93 |
| 2 | 60 | 16.667 | 25.97 | 4.1667 | 18.84 x 10⁶ | 150 x 10³ | 306.58 |
| 3 | 30 | 33.33 | 25.97 | 8.333 | 9.42 x 10⁶ | 150 x 10³ | 613.15 |
| 4 | 25 | 40.00 | 25.97 | 10.000 | 7.85 x 10⁶ | 150 x 10³ | 735.78 |
| 5 | 20 | 50.00 | 25.97 | 12.50 | 6.28 x 10⁶ | 150 x 10³ | 919.73 |
| 6 | 17.5 | 57.14 | 25.97 | 14.29 | 5.49 x 10⁶ | 150 x 10³ | 1052.21 |

Notes:

(1) $\dfrac{di}{dt} = \dfrac{50 \text{ kA}(1.57)}{\dfrac{T}{4}}$;

(2) Length = 150,000 / L(di/dt)

The preceding description of the interrupting process was for the positive portion of the source circuit breaker 5066, but the negative circuit for circuit breaker 5070 operates simultaneously and identically with circuit breaker 5066.

The critical components, such as the cancellation current initiating devices 5084 and second high current initiating device 5092 and the circuit breakers second interrupter 5072a and 5072b are inter-locked to ensure that they will operate together. This is accomplished by the coordinated control components first control circuit 5106 and second control circuit 5108.

Auxiliary components for the coaxial transmission segment 5012 include vacuum pumping systems 5058a and 5058b, which are important in maintaining the dielectric integrity between the coaxial superconductors. Vacuum sources at each end of the transmission line segment, as well as optional additional vacuum sources along the transmission line segment, maintain vacuum and provide redundancy. Additional components include liquid hydrogen terminals 5060, which include refrigeration, storage, and pumping units and at each end, and as may be necessary along the transmission line, of the segment 5012. This equipment is important in maintaining the super conducting properties of the conductors and in moving hydrogen through the segment in a direction based on consumption and hydrogen generation requirements.

Additional equipment required to ensure coordinated functioning of all components within the transmission system 5010 may include local control units 5106, 5108, 5162, 5164 and a master control complex 5062 which analyzes data from sensors located throughout the entire network. These sensors include, but are not limited to, the measurement of hydrogen temperature and pressure, DC current magnitude and direction of current flow, charge voltage on the cancellation current capacitor banks, the current initiating devices firing circuit status, control status of the solid state rectifier/inverters, and the status of the three phase protective network and segment circuit breakers.

Also, the transmission system 5010 must have termination assemblies (not shown) designed to provide adequate insulation for the high voltage DC, while allowing for the conductors to be connected to the four circuit breaker terminals. Additionally, the vacuum and liquid hydrogen conduits must be connected to external pumping and storage systems by means which are adequately insulated for the high voltage DC.

Figure 12:
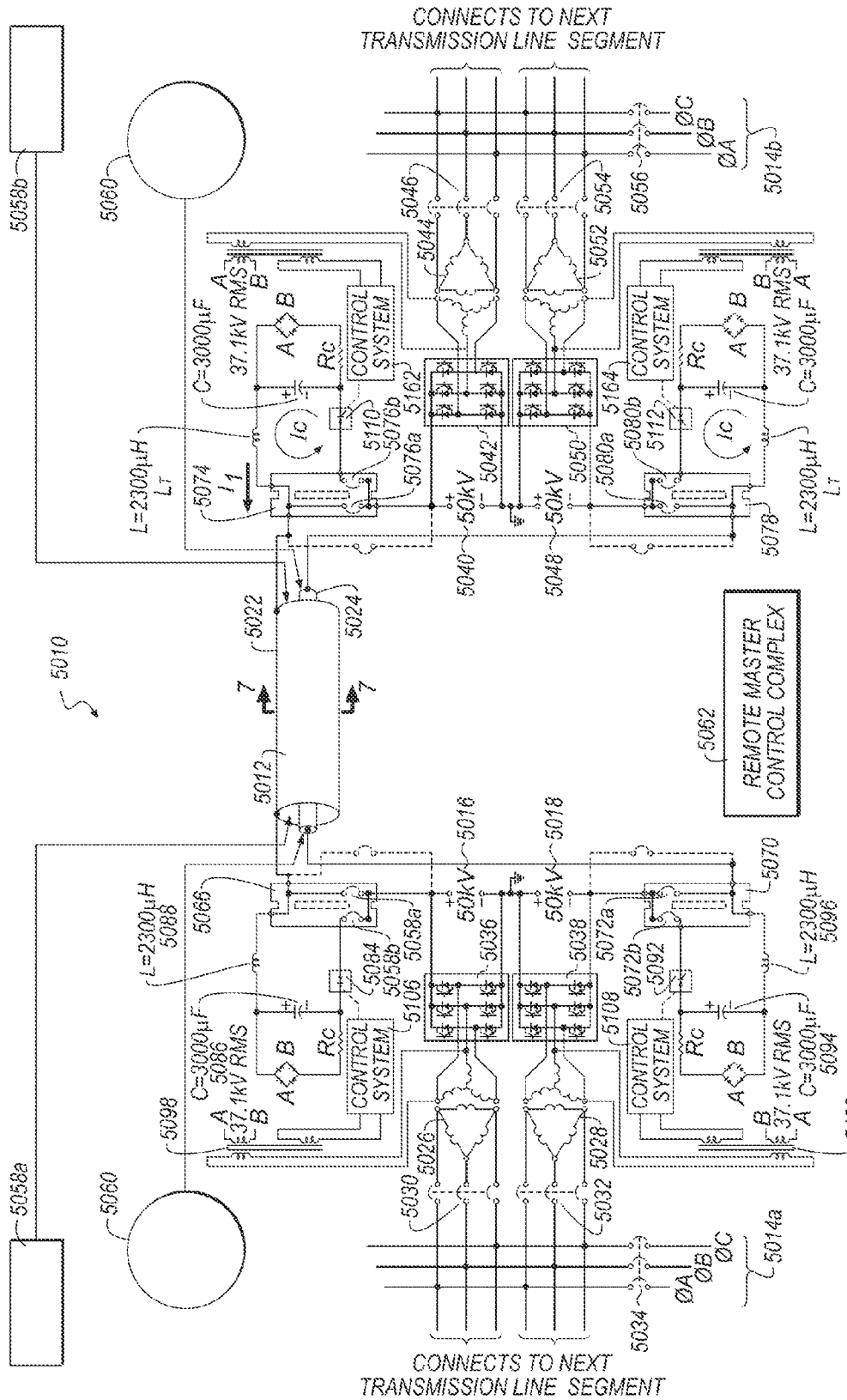
FIG. 12 depicts the superconducting transmission system of FIG. 11 with power being transmitted from right to left in the diagram.

In the event that the direction of current flow is reversed from the previous description, FIG. 12 depicts the DC current flowing from the source (right side of FIG. 12) to the load side of FIG. 12 (left side). The interrupting process will be precisely as described previously, except for the following changes: the current initiating devices 5110 and 5112 will simultaneously fire to produce a cancellation current component k in both the positive and the negative portions of the circuit, thereby producing a current zero in the circuit breakers 5074 and 5078. The current initiating devices 5084 and 5092 and will be inter-locked to prohibit their closing since the circuit interruption will be managed at the source end of the segment.

Cancellation Current Pulse Obtained from the 50/60 Hertz Network

As described hereinabove, a new circuit and method can interrupt 50 kA DC at a voltage of 100 kV between the positive and negative conductors. The method described provides a cancellation current pulse whose frequency, magnitude, and polarity will produce a current zero in the load current, thereby creating the environment necessary to allow an SF6 circuit breaker to interrupt the current. The source of the cancellation current pulse has been described in detail as being created by discharging a capacitor bank through a tuning reactor. This approach is desirable because the frequency can be selected to enhance the interruption of the DC current carried by the transmission line whose length, and, therefore inductance, may influence the transient voltage generated during current interruption.

Figure 13:
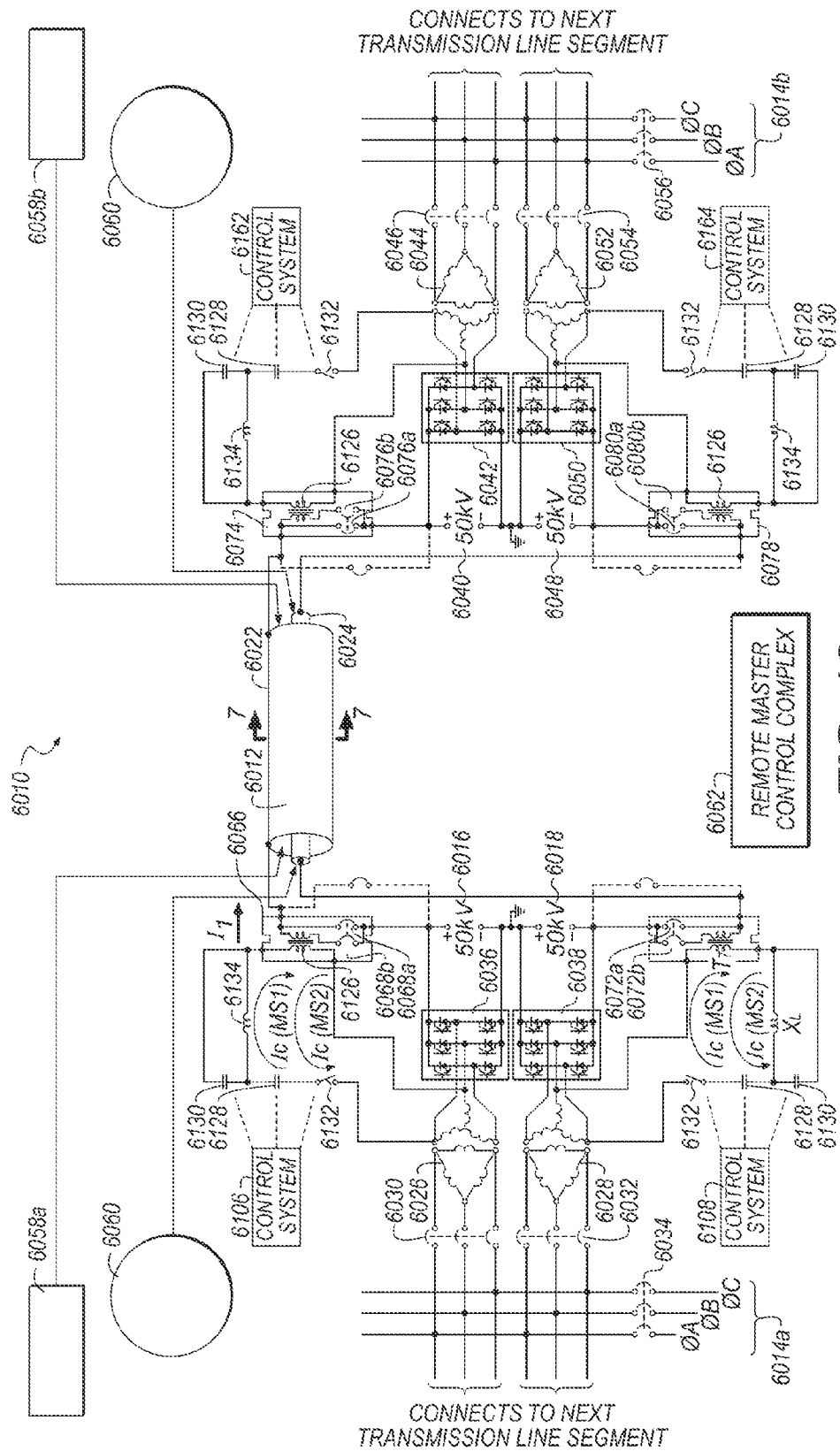
FIG. 13 depicts an electrical diagram of an exemplary embodiment of a superconducting transmission system utilizing an AC voltage derived from the power transformers as the cancellation power source, with power being transmitted from left to right in the diagram.

It may be desirable to obtain an alternative cancellation current directly from the 50 or 60 Hz or other frequency network in circumstances where the frequency is not a vital factor in determining the conditions to insure a successful interruption of the DC current. Turning now to FIG. 13, wherein like numerals indicate like elements from FIGS. 1, 2, and 5, when power is transmitted from the left side to the right side of a coaxial transmission segment 6012, the superconducting transmission system 6010 can include cancellation current injection components in the positive and negative portion of the circuit consisting of specially designed transformers 6026 and 6028 whose primary windings are fed from the network and whose primary and secondary windings enjoy additional physical bracing and are protected by three phase circuit breakers 6030 and 6032 which, when opened together, isolate the segment 6012 from the source network 6014a. Furthermore, the local network is protected by the three phase circuit breaker 6034, which provides a means of disconnecting the local network 6014a from the transmission line segment 6012. In one exemplary embodiment, each transformer bank should be designed to provide 2500 MW DC, the design MW of the system. The transformer bank MW must be 105% of the DC system MW and provide three phase RMS line-to-line voltage of 37,065 Volts and an AC current of 40,809 Amperes. These values when rectified by the poly phase rectifier/inverter 6036 will provide positive polarity DC to the segment connection terminal 6016. The poly phase rectifier/inverter 6038 will provide negative polarized DC to the segment connection 6018. This will result in a 100 kV difference between the coaxial conductors 6022 and 6024.

The cancellation current pulse circuit components which, in the positive portion of the transmission system 6010, includes current initiating device 6128, isolating vacuum switch 6132, current limiting reactor 6134, reactor shorting switch 6130, and an isolation pulse transformer 6126, whose windings are arranged coaxially to minimize leakage reactance and whose core is constructed of high permeability magnetic material to insure that saturation does not occur.

At the load end of the coaxial transmission segment 6012, the positive 50 kV DC at terminal 6040 is connected to the rectifier/inverter component 6042 which will invert the DC voltage to three phase AC voltage which is transformed to the system voltage by transformer bank 6044 and connected to the load network 6014b by three phase circuit breaker 6046. The negative 50 kV DC at terminal 6048 is connected to the rectifier/inverter component 6050 which will invert the DC voltage to three phase AC voltage which is transformed to the system voltage by transformer bank 6052 and connected to the next segment by three phase circuit breaker 6054. The three phase combined output from the transformer banks 6044 and 6052 are connected to the local network by the three phase circuit breaker 6056 which provides both protection and isolation from the local network.

Auxiliary components for the segment 6012 include vacuum pumping systems 6058a and 6058b, which are important in maintaining the dielectric integrity between the coaxial superconductors. Having vacuum sources at each end and optionally along the transmission line of the segment provides redundancy. Additional components include liquid hydrogen terminals 6060, which include refrigeration, storage, and pumping units at each end and optionally along the transmission line of the segment 6012. This equipment maintains the superconducting properties of the conductors and moves hydrogen through the segment in a direction based on consumption and hydrogen generation requirements.

Additional equipment required to ensure coordinated functioning of all components within the transmission system 6010, such as a master control complex 6062 which analyzes data from sensors located throughout the entire network. These sensors include, but are not limited to, the measurement of hydrogen temperature and pressure, DC current magnitude and direction of current flow, control status of the solid state rectifier/inverters and the status of the three phase protective network and segment circuit breakers.

The initiation of the positive cancellation current begins in a carefully controlled sequence of events managed by a supervisory controlled system. The load current $I_1$, which is moving from the left side to the right side of FIG. 13, is interrupted with the opening of circuit breaker 6068a. When its contacts approach the contact maximum gap at $T_2$, the current initiating device 6128, which in the illustrated embodiment is a high capacity thyristor bank, will be fired at the preselected crest of the network voltage wave to obtain a symmetrical cancellation current pulse of the proper polarity through the 6068a contact to obtain a current zero and, consequently, the interruption of the 6068a current. Initially, the contacts of reactor shorting switch 6130 are open, placing the current limiting reactor 6134 in series with the primary winding of the isolation pulse transformer 6126, but with no voltage applied. The interrupter switch 6132 is initially closed allowing 6128 to apply voltage, reduced by the drop across the reactor 6134, to the primary winding of the pulse transformer 6126. After 6068a interrupts the current, the load current $I_1$ is diverted into 6068b and the secondary winding of 6126 which provides a parallel path to 6068a. The pulse transformer 6126 is no longer short circuited, therefore, the reduced voltage on the primary winding and the increased impedance, due to the load current inductance on the secondary side of pulse transformer 6126, will produce a reduced component current which is polarized to add to the $I_1$ current through 6068b. At the time the AC half cycle comes to zero, the current through 6068b and the transformer 6126 secondary winding is the DC load current only.

To complete the interruption of the DC load current, 6068b is given a trip command such that its contacts part at the same time the DC current through 6068a passes through zero and is interrupted. The switch 6130 is triggered at the first voltage crest, following the interruption of the current through 6068a producing a large symmetrical cancellation current pulse, polarized to subtract from the load current, thus forcing it to zero and allowing 6068b to interrupt the circuit. The load current through the transmission line is now completely interrupted.

At the load end of the superconducting transmission system 6010, the network-fed cancellation components in both the positive and negative portions of the circuit include pulse initiating devices 6128, 6130 and reactors 6134 as well as isolating switches 6132 and control systems all of which are not operated because the cancellation pulse is always generated on the source end of a coaxial transmission segment 6012.

Figure 14:
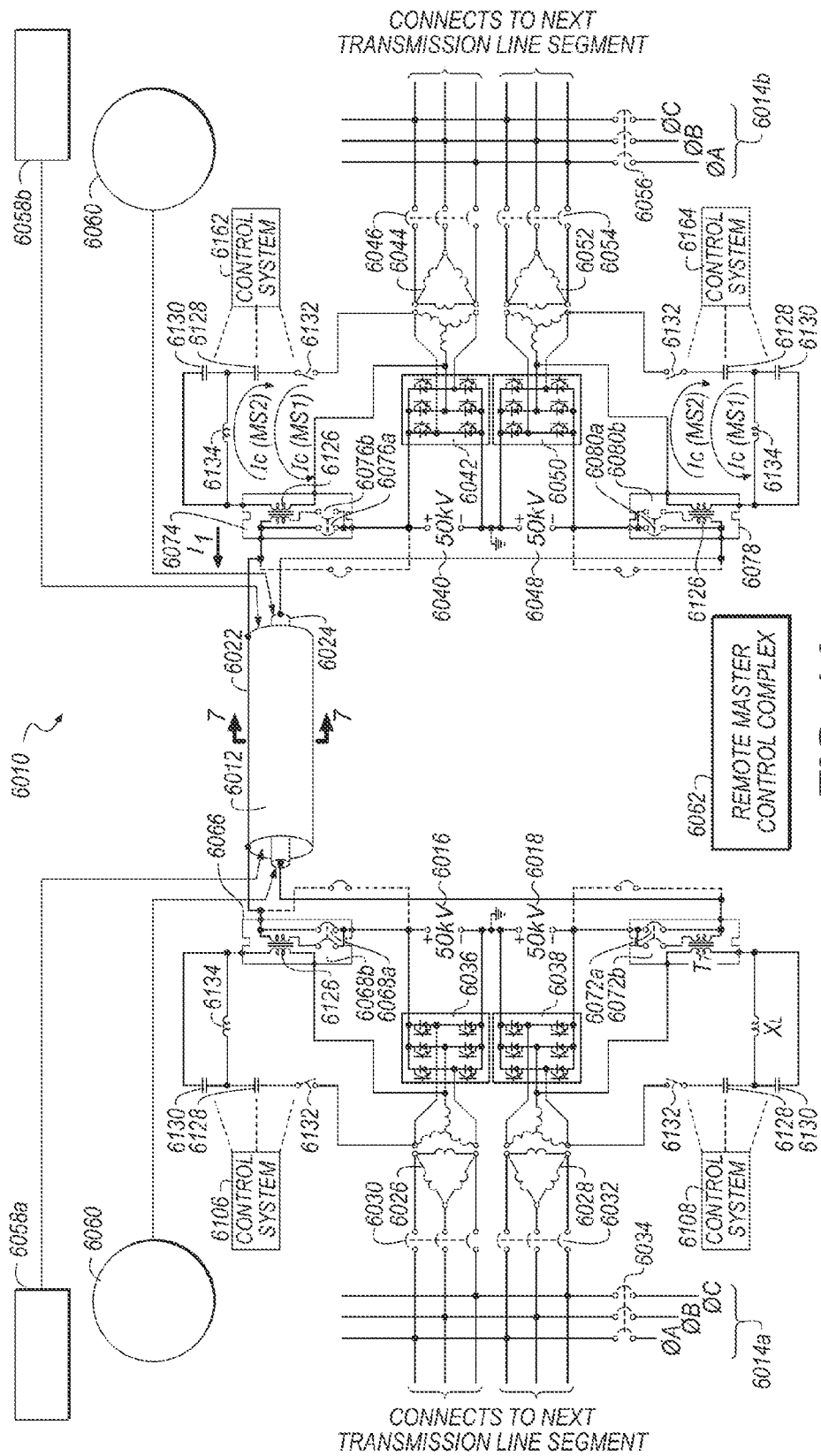
FIG. 14 depicts the superconducting transmission system of FIG. 13 with power being transmitted from right to left in the diagram.

When the direction of power reverses to flow from the source, which is located on the right side of the circuit diagram to the left side, FIG. 14 provides a detailed circuit diagram showing all transmission system 6010 components. The interrupting process will be as previously described, except for the following changes: The supervisory control system in the positive portion (e.g., control system 6162) will initiate the operation of current injection components 6128 MS1, 6130 MS2, 6132, and 6134 to produce load current interruption by circuit breaker 6074 which contains SF6 interrupters third interrupter 6076a and 6076b. The supervisory control system in the negative portion (e.g., control system 6164) will initiate the operation of current injection components 6128 MS1, 6130 MS2, 6132 and 6134 to produce load current interruption by circuit breaker 6078 which contains SF6 interrupters 6080a and 6080b.

Summary AC Breaker Use in DC Application

In summary, and as has been fully described hereinabove and illustrated by several exemplary embodiments, it was realized that according to a new method, an AC breaker can be used to interrupt a DC current associated with a DC voltage sourced application, such as, for example, a DC current of a DC HV transmission line.

Summary of method: As fully described in parent, U.S. Pat. No. 8,774,883, and co-pending Divisional U.S. patent application Ser. No. 14/319,571, SUPERCONDUCTING DIRECT CURRENT TRANSMISSION SYSTEM, filed Jun. 30, 2014, in one embodiment, a method for interrupting a DC current flowing in an AC high voltage circuit breaker includes the steps of: A) providing a bypass switch capable of continuously passing the DC current generated by a DC high voltage source when the bypass switch is closed, the AC high voltage circuit breaker including a first interrupter and a second interrupter, the first interrupter capable of passing the DC current for a period of time and the second interrupter capable of passing a cancellation current for another period of time, and a making switch; B) while both of the first interrupter and the second interrupter are closed and the making switch is open, opening the bypass switch causing the DC current which was previously flowing in the bypass switch to flow through the first interrupter; C) opening the first interrupter causing the DC current to flow through a first interrupter arc as a first contact of the first interrupter moves away from a second contact of the first interrupter causing a gap between the first contact of the first interrupter and the second contact of the first interrupter; D) closing the making switch to cause the cancellation current to flow through the making switch, the second interrupter and the first interrupter arc in a direction opposite to the DC current; E) arc quenching the DC current flowing in the AC high voltage circuit breaker as the gap between the first contact of the first interrupter and the second contact of the first interrupter approaches a maximum gap distance and as a sum of the DC current and the cancellation current in the first interrupter passes through zero; and F) arc quenching the cancellation current in the second interrupter about when a value of the cancellation current reaches or passes through zero.

Summary of circuit structure: As fully described in parent, U.S. Pat. No. 8,774,883, and co-pending Divisional U.S. patent application Ser. No. 14/319,571, SUPERCONDUCTING DIRECT CURRENT TRANSMISSION SYSTEM, filed Jun. 30, 2014, in one embodiment, an electrical circuit to interrupt a DC current includes a bypass switch rated to carry a DC current at continuous duty. An AC high voltage breaker includes a first interrupter and a second interrupter both of the first interrupter and the second interrupter rated for carrying a current having a value of the DC current for a period of time less than or equal to continuous duty. The first interrupter is electrically coupled in parallel with the bypass switch. A first interrupter first terminal is electrically coupled to a bypass switch first terminal and a second interrupter first terminal. A making switch is operatively coupled to an energy source and configured to cause a cancellation current to flow from the energy source either directly or via a coupling transformer through the second interrupter, and through the first interrupter in addition to the DC current following a triggered operation of the making switch. The AC high voltage breaker is adapted to a DC service as the DC current in addition to the cancellation current causes an arc quench which allows the AC high voltage breaker to cause the interruption of the DC current in the electrical circuit.

It is contemplated that many applications of the applications of the new electrical circuit to interrupt a DC current described herein will be associated with a high voltage DC source usually above about 1 kV DC to about 5 kV DC. For example, the exemplary superconducting transmission line example uses a pair of 50 kV DC voltage sources. However, the same techniques of the new electrical circuit to interrupt a DC current are believed to be broadly applicable over wide range of voltages and currents and there may be applications associated with DC source voltages well below 1 kV DC.

Prior Art DC circuit breakers: There are prior art DC circuit breakers rated to about 4 kV DC, useful to about 40 kA. However, the techniques used by such prior art devices are quite different than the electrical circuit to interrupt a DC current described herein. Typically, the prior art DC circuit breakers control the generation of the arc voltage through control of arc movement, arc plate design, magnetic field magnitude which moves the arc into the arc chute, etc. Unfortunately, the process of pulling the current toward zero generates voltage transients in high inductive DC circuits.

By comparison, the electrical circuit to interrupt a DC current described herein, which uses a cancellation current component to produce a current zero and utilizing conventional AC circuit breakers, does not generate transients in DC circuits, since the di/dt is controlled.

Triggered Spark Gap as the Making Switch

It was realized that a triggered spark gap is suitable for use as the making switch. Triggered spark gaps are known to those skilled in the art. For example, a triggered spark gap was described in U.S. Pat. No. 3,210,590, MAIN SERIES CAPACITOR PROTECTIVE SPARK GAP, issued Oct. 5, 1965 to O. Jenson and W. A. Carter. The '590 patent is incorporated herein by reference in its entirety for all purposes. It was further contemplated that a newly modified version of the spark gap of the '590 patent would be particularly suitable for use as a making switch in the system and method to interrupt a DC current in a high voltage circuit by use of an AC breaker of the present application.

Figure 15:
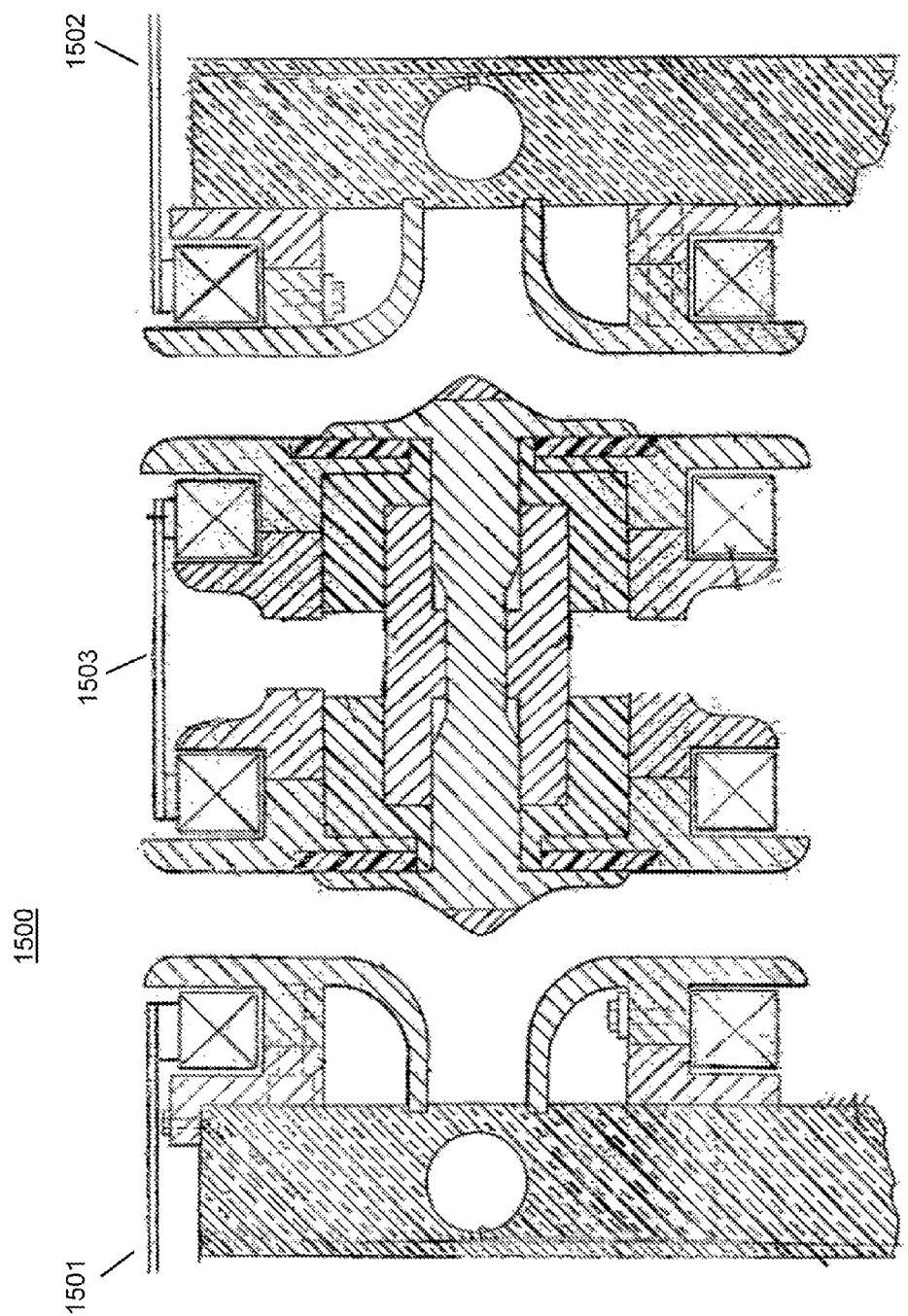
FIG. 15 shows an exemplary cross sectional view of a new triggered spark gap suitable for use as making switch.

FIG. 15 shows a cross sectional view of one exemplary embodiment of a new triggered spark gap 1500 believed suitable for use as cancellation current initiation device. Device terminals 1501 and 1502 are completed (closed) on application of an electrical trigger, such as, for example, a trigger pulse to trigger terminal 1503. The electrodes of the spark gap must be protected from physical damage, such as pitting and melting since many multiple operations are anticipated. To accomplish this, the high current arc created by triggering the gap, is moved, at high peripheral speed by magnetic force. The magnetic field which produces this force is generated by four copper coils which are shown in FIG. 15. The arrangement of the electrodes is different from the original Series Capacitor Protective Gap (U.S. Pat. No. 3,210,590) in that the dielectric integrity at a current zero is not needed since the circuit breaker in series with the spark gap provides the dielectric. Simplicity, reliability, and ruggedness are the primary design objectives for the spark gap shown in FIG. 15.

Figure 16:
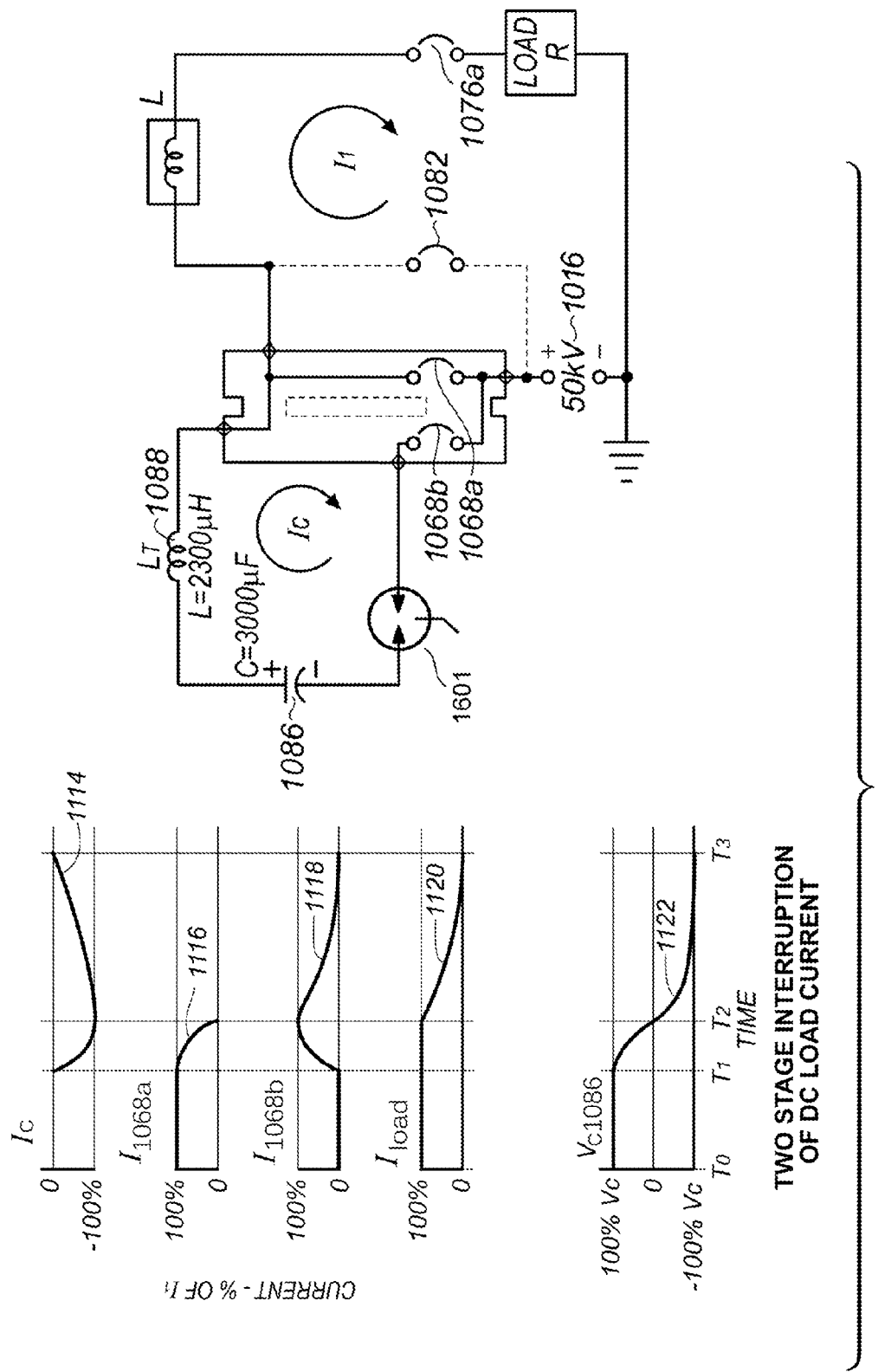
FIG. 16 shows a schematic diagram of an exemplary embodiment of the circuit of FIG. 4 using a triggered spark gap as the making switch.

FIG. 16 shows a schematic diagram of an exemplary embodiment of the circuit of FIG. 4 using a triggered spark gap 1601. Triggered spark gap 1601 can be for example, a triggered spark gap 1500 of the new type shown in FIG. 15. However, any suitably modified type of triggered spark gap can be used as the cancellation current initiating device, however, the electrodes should be protected from arc damage.

AC Breaker Use in DC Current Interrupting Application without a Bypass Switch

The bypass switch is used in relatively high current DC applications (e.g. 50 kA) where a maximum continuous current rating of standard AC high voltage circuit breakers are in the order of 5-6 kA, with a short time rating of 63 kA or even 80 kA for 1 second making it possible to use in our 50 kA switching scheme described hereinabove. However, if the DC current rating of the transmission system is low enough to be within the continuous current rating of (at least) interrupter one, the bypass switch is not needed.

For example, in some of the applications described hereinabove, the bypass switch can carry the designed DC current continuously for an indefinite time (at a 100% duty cycle), while the first and second interrupters of the AC breaker can carry the DC current for time sufficient to perform the current interruption operation, but not at continuous duty for an unlimited period of time. However, it has been realized that there are many lower current HV DC applications, including HV DC transmission line application where the first and second interrupters of a commercially available breaker are sufficiently rated for continuous operation of the DC current used in those applications. For example, typical submarine (underwater) transmission systems as well as some overhead transmission lines often use DC to minimize the electrical losses and number of conductors required. Many of these DC HV transmission line systems operate at DC voltages as high as +/−650 kV DC and can transmit up to about 2000 MW. Yet, because of the ultra-high voltage, the corresponding DC currents are relatively low and often well within the ampacity ratings of standard AC high voltage circuit breakers as visualized for interrupter one and two in our switching scheme. In such situations, where the ampacity rating of the interrupters of the AC breaker is sufficient to carry the transmission line current at 100% duty cycle (continuous duty), a bypass switch is no longer needed as part of the circuit and method to interrupt a DC current using an AC breaker as described herein. Note that even in the absence of the bypass switch, the new circuit and method is still used, because an AC breaker cannot otherwise arc quench a DC current.

Similarly, offshore wind farms often us an AC-DC-AC conversion to convert a variable frequency output of the wind turbine to 50 Hz or 60 Hz system frequency. The power rating of a single turbine can be as high as 5-6 MW. It is further contemplated that in such situations where the DC voltage levels can be several tens of kV transmission lines from offshore wind farms will also fall well within the capabilities of our switching scheme without need for the additional bypass switch.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. A method for interrupting a DC current flowing in an AC high voltage circuit breaker comprising the steps of:
   providing said AC high voltage circuit breaker comprising a first interrupter and a second interrupter, said first interrupter capable of passing said DC current for a period of time and said second interrupter capable of passing a cancellation current for another period of time, and a making switch;
   opening said first interrupter causing said DC current to flow through a first interrupter arc as a first contact of said first interrupter moves away from a second contact of said first interrupter causing a gap between said first contact of said first interrupter and said second contact of said first interrupter;
   closing said making switch to cause said cancellation current to flow through said making switch, said second interrupter and said first interrupter arc in a direction opposite to said DC current;
   arc quenching said DC current flowing in said AC high voltage circuit breaker as said gap between said first contact of said first interrupter and said second contact of said first interrupter approaches a maximum gap distance and as a sum of said DC current and said cancellation current in said first interrupter passes through zero; and
   arc quenching said sum of said DC current and said cancellation current in said second interrupter about when a value of said cancellation current reaches or passes through zero.

2. The method of claim 1, wherein said step of providing further comprises providing a bypass switch capable of continuously passing said DC current generated by a DC voltage source when said bypass switch is closed, and before said step of opening said first interrupter, while both of said first interrupter and said second interrupter are closed and said making switch is open, opening said bypass switch causing said DC current which was previously flowing in said bypass switch to flow through said first interrupter.

3. The method of claim 1, wherein said step of arc quenching said sum of said DC current and said cancellation current comprises extinguishing said cancellation current flowing in said second interrupter when said cancellation current reaches zero as caused by a tuned voltage source.

4. The method of claim 1, wherein said step of arc quenching said sum of said DC current and said cancellation current comprises extinguishing said cancellation current flowing in said second interrupter when said cancellation current reaches zero of an AC cycle wherein said cancellation current is generated by an AC voltage source or an oscillating DC voltage source.

5. The method of claim 1, wherein said step of arc quenching said sum of said DC current and said cancellation current comprises extinguishing said cancellation current flowing in said second interrupter when a series wired capacitor reaches an equilibrium charge state.

6. The method of claim 1, wherein said step of providing comprises providing said making switching comprising at least one silicon controlled rectifier (SCR).

7. The method of claim 1, wherein said step of providing comprises providing said making switching comprising at least one triggered spark gap.

8. The method of claim 1, wherein said step of providing comprises providing said making switching comprising at least one fast electrically triggered mechanical switch.

9. The method of claim 1, wherein said step of providing said AC high voltage circuit breaker comprising said first interrupter and said second interrupter comprises providing said AC high voltage circuit breaker comprising said first interrupter and said second interrupter wherein said first interrupter and said second interrupter are independently operable by a first interrupter trigger signal and a second interrupter trigger signal.

10. The method of claim 1, wherein said step of providing said AC high voltage circuit breaker comprising said first interrupter and said second interrupter comprises providing said AC high voltage circuit breaker comprising said first interrupter and said second interrupter wherein said first interrupter and said second interrupter are operated by a common mechanism wherein following a common trigger signal there is a time delay t between said first interrupter opening and said second interrupter opening.

11. The method of claim 1, wherein said steps of interrupting said DC current flowing in said AC high voltage circuit breaker comprise interrupting said DC current associated with a DC high voltage transmission line operating at a transmission line voltage of greater than or equal to 5 kV.

12. The method of claim 1, wherein said steps of interrupting said DC current flowing in said AC high voltage circuit breaker comprise interrupting said DC current associated with a DC high voltage submarine transmission line.

13. The method of claim 1, wherein said steps of interrupting said DC current flowing in said AC high voltage circuit breaker comprise interrupting said DC current associated with a DC high voltage sourced from one or more wind generators.

14. An electrical circuit to interrupt a DC current comprising:
   an AC high voltage breaker comprising a first interrupter and a second interrupter both of said first interrupter and said second interrupter rated for carrying a current having a value of said DC current for a period of time less than or equal to continuous duty, a first interrupter first terminal electrically coupled to a second interrupter first terminal;
   a making switch operatively coupled to an energy source and configured to cause a cancellation current to flow from said energy source either directly or via a coupling transformer through said second interrupter, and through said first interrupter in addition to said DC current following a triggered operation of said making switch; and
   wherein said AC high voltage breaker is adapted to a DC service as said DC current in addition to said cancellation current causes an arc quench which allows said AC high voltage breaker to cause said interruption of said DC current in addition to said cancellation current in said electrical circuit.

15. The electrical circuit of claim 14, wherein said electrical circuit to interrupt said DC current further comprises a bypass switch rated to carry said DC current at continuous duty, and said first interrupter is electrically coupled in parallel with said bypass switch, and said first interrupter first terminal is electrically coupled to a bypass switch first terminal and said second interrupter first terminal.

16. The electrical circuit of claim 14, wherein said DC current is associated a high voltage transmission line operating at a transmission line voltage of 5 kV or greater.

17. The electrical circuit of claim 14, wherein said making switch comprises at least one silicon controlled rectifier (SCR).

18. The electrical circuit of claim 14, wherein said making switch comprises at least one triggered spark gap.

19. The electrical circuit of claim 14, wherein said making switch comprises at least one fast electrically triggered mechanical switch.

20. The electrical circuit of claim 14, wherein said making switch is disposed in electrical series between said second interrupter second terminal and said energy source.

21. The electrical circuit of claim 14, wherein said making switch is operatively coupled between said energy source and a first winding of said coupling transformer, and a second winding of said coupling transformer electrically disposed in series between said second interrupter and said first interrupter second terminal, said transformer configured to cause said cancellation current to flow in said first interrupter in addition to said DC current after a closure of said making switch.

22. The electrical circuit of claim 14, wherein said energy source comprises a tuned voltage source.

23. The electrical circuit of claim 14, wherein said energy source comprises an AC voltage source or an oscillating DC voltage source.

24. The electrical circuit of claim 14, wherein said electrical circuit comprises a DC voltage source dual cancellation circuit or an AC voltage source dual cancellation circuit.

\* \* \* \* \*